(12) United States Patent
Kuksenkov et al.

(10) Patent No.: US 8,573,785 B2
(45) Date of Patent: Nov. 5, 2013

(54) WAVELENGTH-SWITCHED OPTICAL SYSTEMS

(75) Inventors: Dmitri Vladislavovich Kuksenkov, Big Flats, NY (US); Shenping Li, Painted Post, NY (US); Dragan Pikula, Horseheads, NY (US); Rostislav Vatchev Roussev, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 381 days.

(21) Appl. No.: 12/952,260

(22) Filed: Nov. 23, 2010

(65) Prior Publication Data

US 2012/0127437 A1   May 24, 2012

(51) Int. Cl.
- G03B 21/00 (2006.01)
- G03B 21/26 (2006.01)
- G02F 1/35 (2006.01)
- G02F 2/02 (2006.01)
- H01S 3/10 (2006.01)

(52) U.S. Cl.
USPC ............ 353/94; 353/122; 359/328; 372/22; 372/23

(58) Field of Classification Search
USPC .......... 353/94, 122, 31, 69; 372/21–23, 28, 372/38.06–38.07, 43.01; 359/326, 328
See application file for complete search history.

(56) References Cited

U.S. PATENT DOCUMENTS

| | | | |
|---|---|---|---|
| 4,511,220 A | 4/1985 | Scully | 350/403 |
| 5,233,460 A | 8/1993 | Partlo et al. | 359/247 |
| 5,253,259 A * | 10/1993 | Yamamoto et al. | 372/22 |
| 5,379,311 A * | 1/1995 | McFarlane et al. | 372/41 |
| 5,386,426 A * | 1/1995 | Stephens | 372/20 |
| 5,388,114 A | 2/1995 | Zarrabi et al. | 372/22 |
| 5,404,224 A | 4/1995 | Kotidis et al. | 356/351 |
| 5,418,802 A | 5/1995 | Chwalck | 372/20 |
| 5,438,584 A | 8/1995 | Paoli et al. | 372/45 |

(Continued)

FOREIGN PATENT DOCUMENTS

| | | |
|---|---|---|
| EP | 0798830 | 8/1996 |
| EP | 1329760 | 11/2002 |

(Continued)

OTHER PUBLICATIONS

International Search Report issued in International counterpart application No. PCT/US11/60933, Apr. 10, 2012.

(Continued)

*Primary Examiner* — Tony Ko
*Assistant Examiner* — Jori S Reilly-Diakun
(74) *Attorney, Agent, or Firm* — Svetlana Z. Short

(57) ABSTRACT

Optical systems operable to emit an output beam having fast-switched wavelengths are provided. In one embodiment, an optical system includes a laser and a wavelength conversion device. The laser emits a pump beam that switches between at least two fundamental spectral peaks at different wavelengths at a wavelength cycling period that is shorter than a response time of the human eye. The wavelength conversion device includes a non-linear optical medium configured to phase match the frequency doubling of the at least two switched fundamental spectral peaks such that an output beam that switches between at least two frequency-converted spectral peaks at different converted-wavelengths is emitted from an output facet of the wavelength conversion device when the pump beam of the optical source is incident on an input facet of the wavelength conversion device.

25 Claims, 17 Drawing Sheets

(56) References Cited

U.S. PATENT DOCUMENTS

| | | | |
|---|---|---|---|
| 5,589,936 | A | 12/1996 | Uchikawa et al. ............ 356/345 |
| 5,828,684 | A | 10/1998 | Van de Walle ................ 372/45 |
| 6,011,643 | A | 1/2000 | Wunderlich et al. .......... 359/279 |
| 6,222,861 | B1 * | 4/2001 | Kuo et al. ..................... 372/20 |
| 6,323,984 | B1 | 11/2001 | Trisnadi ........................ 359/245 |
| 6,393,038 | B1 | 5/2002 | Raymond et al. ............. 372/22 |
| 6,574,015 | B1 | 6/2003 | Tselikov et al. .............. 359/111 |
| 6,577,429 | B1 | 6/2003 | Kurtz et al. ................... 359/279 |
| 6,600,590 | B2 | 7/2003 | Roddy et al. .................. 359/287 |
| 6,608,852 | B2 * | 8/2003 | Govorkov et al. ............. 372/75 |
| 6,650,673 | B2 | 11/2003 | Hong et al. .................... 372/50 |
| 6,819,702 | B2 * | 11/2004 | Sverdlov et al. .............. 372/102 |
| 6,879,606 | B1 | 4/2005 | Miesak ........................... 372/31 |
| 6,897,992 | B2 | 5/2005 | Kikuchi ......................... 359/237 |
| 6,956,878 | B1 | 10/2005 | Trisnadi ......................... 372/27 |
| 7,030,383 | B2 | 4/2006 | Babayoff et al. ........ 250/370.08 |
| 7,116,468 | B2 | 10/2006 | Miller ........................... 359/326 |
| 7,119,936 | B2 | 10/2006 | Kowarz et al. ................ 359/224 |
| 7,136,159 | B2 | 11/2006 | Tsai et al. ................... 356/237.5 |
| 7,166,017 | B2 | 1/2007 | Minamihaba et al. ........... 451/36 |
| 7,171,129 | B1 | 1/2007 | Blair et al. ..................... 398/203 |
| 7,173,950 | B2 | 2/2007 | Hand et al. ..................... 372/22 |
| 7,187,500 | B2 | 3/2007 | Chuang et al. ................. 359/618 |
| 7,193,765 | B2 | 3/2007 | Christensen et al. .......... 359/279 |
| 7,214,946 | B2 | 5/2007 | Babayoff et al. ........ 250/370.08 |
| 7,244,028 | B2 | 7/2007 | Govorkov et al. ............. 353/37 |
| 7,265,897 | B2 | 9/2007 | Miller et al. ................... 359/326 |
| 7,289,261 | B2 | 10/2007 | Miller ........................... 359/326 |
| 7,420,997 | B2 * | 9/2008 | Bhatia et al. ................ 372/38.07 |
| 7,738,527 | B2 | 6/2010 | He ................................ 372/94 |
| 7,809,032 | B2 | 10/2010 | Fujii et al. |
| 8,009,358 | B2 * | 8/2011 | Zalevsky et al. .............. 359/618 |
| 8,045,260 | B2 | 10/2011 | Bhatia et al. |
| 2002/0164123 | A1 | 11/2002 | Hmerly et al. ................. 385/39 |
| 2002/0180869 | A1 | 12/2002 | Callison et al. ............... 348/203 |
| 2003/0012239 | A1 | 1/2003 | Daiber et al. ............... 372/38.01 |
| 2004/0165621 | A1 | 8/2004 | Chuang et al. ................. 372/25 |
| 2005/0249256 | A1 | 11/2005 | He ............................... 372/50.1 |
| 2006/0012842 | A1 | 1/2006 | Abu-Ageel ................... 359/193 |
| 2006/0018025 | A1 | 1/2006 | Sharon et al. ................. 359/618 |
| 2006/0023165 | A1 | 2/2006 | Ishihara et al. ................ 353/20 |
| 2006/0092515 | A1 | 5/2006 | Kim et al. ..................... 359/566 |
| 2006/0146896 | A1 | 7/2006 | Park ........................ 372/29.023 |
| 2006/0165138 | A1 | 7/2006 | Kachanov et al. |
| 2006/0221429 | A1 | 10/2006 | Christensen et al. .......... 359/279 |
| 2007/0008519 | A1 | 1/2007 | Naftali et al. ............... 356/237.2 |
| 2007/0058135 | A1 | 3/2007 | Morikawa et al. ............. 353/30 |
| 2007/0086492 | A1 | 4/2007 | Betin et al. ..................... 372/9 |
| 2007/0133630 | A1 | 6/2007 | Ha ................................ 372/26 |
| 2007/0188716 | A1 | 8/2007 | Hashimoto .................... 353/30 |
| 2007/0223091 | A1 | 9/2007 | Lee .............................. 359/494 |
| 2008/0175284 | A1 | 7/2008 | Konttinen et al. .............. 372/22 |
| 2010/0150190 | A1 | 6/2010 | Masood et al. |

FOREIGN PATENT DOCUMENTS

| | | |
|---|---|---|
| EP | 1260850 | 11/2005 |
| EP | 1734771 | 12/2006 |
| WO | 95/25369 | 9/1995 |
| WO | 2008/087253 | 7/2008 |
| WO | 2009/022291 | 2/2009 |

OTHER PUBLICATIONS

"Dual Wavelength Asymmetric Cladding InGaAs-GaAs Ridge Waveguide Distributed Bragg Reflector Lasers"; Roh et al; IEEE Photonics Technology Letters; vol. 11; No. 1, Jan. 1999; p. 15-17.

"Two Longitudinal Mode Laser Diodes"; Iio et al; IEEE Photonics Technology Letters; vol. 7; No. 9, Sep. 1995; p. 959-961.

"Multiple channel wavelength conversion by use of engineered quasi-phase-matching structures in $LiNbO_3$ waveguides"; Chou et al; Optics Letters; Aug. 15, 1999; vol. 24, No. 16; p. 1157-1159.

"Engineering competing nonlinearities"; Bang et al; Optics Letters; Oct. 15, 1999; vol. 24; No. 20; p. 1413-1415.

"Multiple quasi-phase-matched $LiNbO_3$ wavelength converter with a continuously phase-modulated domain structure"; Asobe et al; Optics Letters; vol. 28, No. 7, Apr. 1, 2003; p. 558-560.

"Nonlinear multiwavelength conversion based on an aperiodic optical superlattice in lithium niobate"; Lee et al; Optics Letters; Dec. 15, 2002; vol. 27; No. 24; p. 2191-2193.

"Broad-Band Second-Harmonic Generation in $LiNbO_3$ Waveguide Using Optimized Domain Inverted Grating"; Wu et al; Journal of Applied Physics; Vo. 33(1994), p. 1163-1166.

"Multiple quasi phase matching in a nonperiodic domain inverted optical superlattice"; Chen et al; Physical Review; A69; 013818 (2004); p. 013818-1 to 013818-4.

"Experimental realization of second harmonic generation in a fibonaci optical superlattice of $LiTaO_3$"; Zhu et al; Physical Review Letters; Apr. 7, 1997; vol. 78; No. 14; p. 2752-2755.

"Quasi phase matched third harmonic generation in a quasi periodic optical superlattice"; Zhu et al; Science Magazine; Oct. 31, 1997; p. 843-846.

"Quasi phase matched second harmonic generation: tuning and tolerances"; Fejer et al; IEEE Journal of Quantum Electronics; vol. 28; No. 11; November 992; p. 2631-2654.

"Visible laser sources based on frequency doubling in nonlinear waveguides"; Webjorn et al; IEEE Journal of Quantum Electronics, vol. 33, No. 10, Oct. 1997.

Trisnadi, JA "Hadamard speckle contrast reduction", Optics Letters, 2004, pp. 11-13, vol. 29.

\* cited by examiner

WAVELENGTH-SWITCHED OPTICAL SYSTEMS

CROSS-REFERENCE TO RELATED APPLICATIONS

This application is related to U.S. patent application Ser. No. 12/782,205 filed on May 18, 2010, entitled "Multiple Wavelength Optical Systems," but does not claim priority thereto.

BACKGROUND

1. Field

Embodiments of the present disclosure generally relate to optical systems such as laser systems. More specifically, the embodiments relate to optical systems capable of producing an output beam having a switched wavelength for reducing the appearance of speckle.

2. Technical Background

While blue and red semiconductor lasers are currently readily available, the progress in nitride semiconductor technology has not yet resulted in a creation of native green lasers with sufficient output power, efficiency and cost effectiveness. An attractive alternative is to use a near-infrared (1060 nm) laser diode and generate green light by frequency doubling in a nonlinear optical medium such as periodically poled lithium niobate (PPLN) crystal. This allows for a small package size and reasonable efficiency, but results in a high level of speckle in projected images due to the high spectral and spatial coherence of the laser source.

Speckle is observed whenever a coherent light source is used to illuminate a rough surface, for example, a screen, wall, or any other object that produces a diffused reflection or transmission. Particularly, a multitude of small areas of the screen or other reflecting objects scatter light into a multitude of reflected beams with different points of origination and different propagation directions. At an observation point, for example in the eyes of an observer or at the sensor of a camera, these beams interfere constructively to form a bright spot, or destructively to form a dark spot, producing a random granular intensity pattern known as speckle. Speckle causes high spatial frequency noise in the projected image. Speckle may be characterized by grain size and contrast, the latter usually defined as a ratio of standard deviation to mean light intensity in the observation plane. For a large enough illuminated area and a small enough surface roughness, the speckle will be "fully developed," with a brightness standard deviation of 100%. If an image is formed on the screen using a coherent light source such as a laser beam, such granular structure will represent noise resulting in serious degradation of the image quality. This noise presents a significant problem, particularly when the projector is used to display high-spatial-frequency image content, such as text.

Accordingly, a need exists for optical systems that reduce the appearance of speckle to improve the image quality of laser projected images.

SUMMARY

In one embodiment, an optical system includes a laser and a wavelength conversion device. The laser emits a pump beam that switches between at least two fundamental spectral peaks at different wavelengths at a wavelength cycling period that is shorter than a response time of the human eye. The wavelength conversion device includes a non-linear optical medium configured to phase match the frequency doubling of the at least two switched fundamental spectral peaks such that an output beam that switches between at least two frequency-converted spectral peaks at different converted-wavelengths is emitted from an output facet of the wavelength conversion device when the pump beam of the optical source is incident on an input facet of the wavelength conversion device.

In another embodiment, an optical system includes a laser and a wavelength conversion device. The laser emits a pump beam that switches between at least two fundamental spectral peaks separated by at least 0.4 nm at a wavelength cycling period. The wavelength conversion device includes a non-linear optical medium that is quasi-periodically poled with a plurality of poling domains positioned along a longitudinal optical axis of the wavelength conversion device in accordance with a phase-modulated periodicity that is characterized by a phase modulation function superimposed on a carrier periodicity such that respective positions of at least some of the poling domains are longitudinally shifted relative to normal periodic positions defined by the carrier periodicity. The phase-modulated periodicity of the plurality of poling domains is such that the wavelength conversion device is characterized by at least two phase matching peaks that phase match the frequency doubling of the at least two switched fundamental spectral peaks such that an output beam that switches between at least two frequency-converted spectral peaks separated by at least 0.2 nm in wavelength is emitted from an output facet of the wavelength conversion device when the pump beam of the optical source is incident on an input facet of the wavelength conversion device. The optical system is programmed to generate at least a portion of a laser image on a projection surface by operating the laser for optical emission of encoded image data, the laser image comprising a plurality of successive image frames temporally separated by an inter-frame time, and to control the laser such that the pump beam switches between the at least two fundamental spectral peaks during the inter-frame time.

According to yet another embodiment, an optical system includes a laser and a wavelength conversion device. The laser emits a pump beam that switches between at least two fundamental spectral peaks at different wavelengths at a wavelength-switching time, the at least two fundamental spectral peaks being separated by at least 0.2 nm at a wavelength-switching rate and having a spectral bandwidth greater than or equal to 0.2 nm The wavelength conversion device includes a non-linear optical medium configured to phase match the frequency doubling of the at least two switched fundamental spectral peaks such that an output beam that switches between at least two frequency-converted spectral peaks at different converted-wavelengths with approximately equal power is emitted from an output facet of the wavelength conversion device when the pump beam of the optical source is incident on an input facet of the wavelength conversion device.

DETAILED DESCRIPTION

Figure 1:
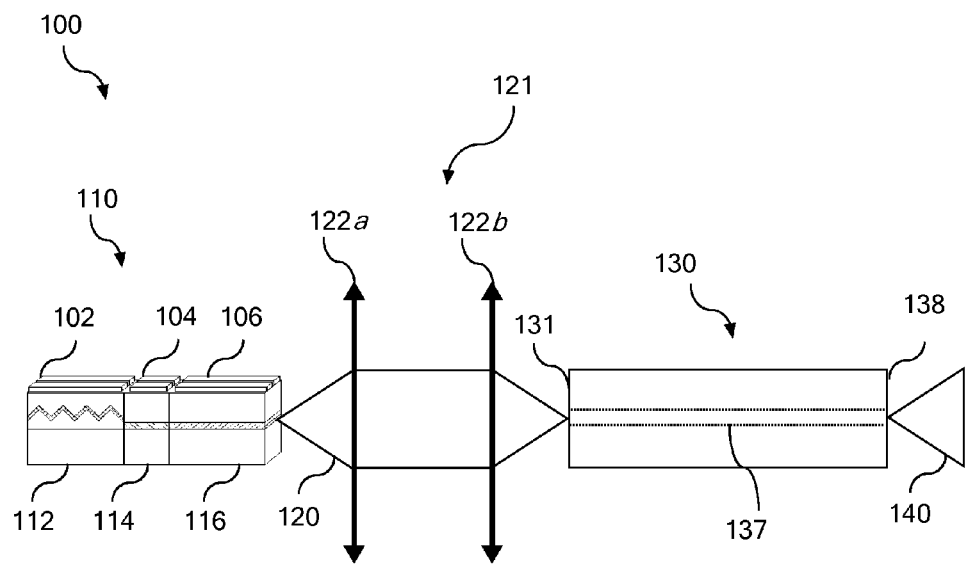
FIG. 1 is a schematic diagram of an optical system according to one or more embodiments shown and described herein.

Embodiments described herein generally relate to optical systems that may reduce the appearance of speckle in images when incorporated into a laser projector system. Although embodiments described herein may be described in the context of laser projection systems, embodiments are not limited thereto; embodiments described herein may be incorporated into systems other then laser projector systems.

Reference will now be made in detail to embodiments of the present disclosure, examples of which are illustrated in the accompanying drawings. Whenever possible, the same reference numerals will be used throughout the drawings to refer to the same or like parts. The optical system generally comprises at least one semiconductor laser, optional coupling optics, and a wavelength conversion device. A package controller may be included to operate the semiconductor laser and/or coupling optics. The output of the semiconductor laser is optically coupled into the input of the wavelength conversion device either directly or by the use of the coupling optics. The semiconductor laser produces a pump beam that switches between at least two fundamental spectral peaks separated by $\Delta\lambda_F$. The wavelength conversion device converts the energy of the pump beam emitted by the semiconductor laser into an output beam having at least two frequency-converted spectral peaks. Various components and configurations of the optical system will be further described herein.

Figure 2:
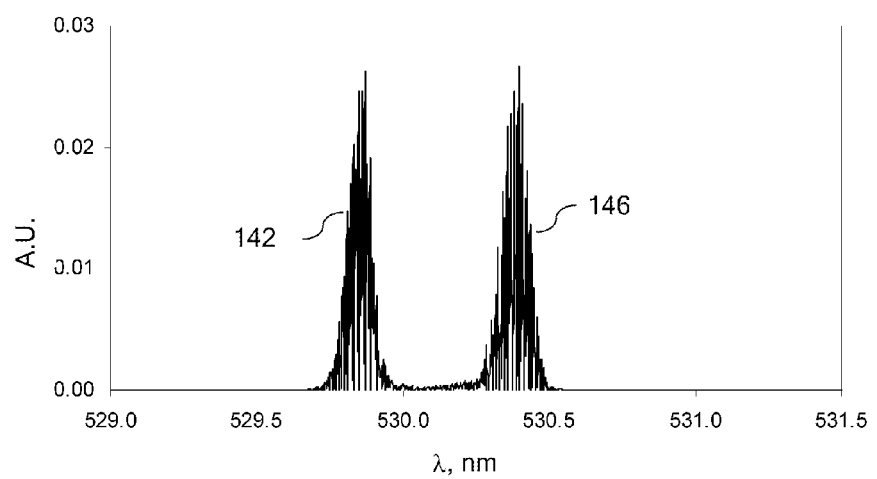
FIG. 2 is a graph depicting a combined optical spectrum of the frequency converted output beam produced by one or more embodiments as shown and described herein.

FIG. 1 generally depicts an optical system 100 described herein. A pump beam 120 emitted by the semiconductor laser 110 may have two or more switched fundamental spectral peaks in the infrared wavelength band. The pump beam 120 may be either directly coupled into a waveguide portion 137 of the wavelength conversion device 130 or can be coupled into the waveguide portion of wavelength conversion device 130 using adaptive optics, illustrated as first and second coupling optics 121 (e.g., lenses 122a and 122b). The wavelength conversion device 130 converts the output wavelengths of the pump beam 120 into higher harmonic waves and produces a visible output beam 140 having at least two switched frequency-converted spectral peaks 142 and 146 (FIG. 2). This type of optical package is particularly useful in generating shorter wavelength laser beams from longer wavelength semiconductor lasers and can be used, for example, as a visible light source for laser projection systems.

The optical source 110 may comprise one or more lasers, such as distributed feedback (DFB) lasers, distributed Bragg reflector (DBR) lasers, vertical cavity surface-emitting lasers (VCSEL), vertical external cavity surface-emitting lasers (VECSEL) or Fabry-Perot lasers, for example. In addition, if the laser gain medium is a semiconductor medium, it may involve the use of carrier confinement in quantum wells, quantum wires, or quantum dots. In laser projection system applications, the optical source may comprise three semiconductor lasers: a first semiconductor laser to emit a beam in the red spectral range, a second semiconductor laser to emit a beam in the blue spectral range, and a third semiconductor laser to emit a beam in the infrared spectral range, which is then frequency up-converted into one or more frequency-converted spectral peaks in a frequency up-converted range (e.g., the green or yellow spectral range). The optical source 110 and optical system 100 may be programmed and operated together with scanning or image forming optics (not shown in figures) to generate a laser projected image comprising a plurality of pixels across a projection surface.

In some instances, speckle may be present in a laser-produced image. Speckle results from random interference—light reflected by random roughness features on the screen surface can interfere constructively and destructively, causing bright and dark sports to appear in the image. If light of different wavelengths is present in the beam illuminating the screen, the interference can be constructive for one wavelength and destructive for another one, partially or completely canceling the net effect. Combining N uncorrelated speckle patterns in the image can help reduce the speckle contrast by $\sqrt{N}$. The two speckle patterns produced by two wavelengths separated by $\Delta\lambda$ are correlated by less than $1/e^2$ if:

$$|\Delta\lambda| \geq \frac{1}{2\sqrt{2\pi}} \frac{\lambda^2}{\sigma_h}, \quad \text{Eq. (1),}$$

where $\sigma_h$ is the standard deviation of the screen surface local height (measure of roughness). Assuming mean wavelength of about 530 nm and roughness at the projection surface of about 100 µm, the wavelength separation of the frequency-converted spectral peaks should be greater than or equal to about 0.56 nm. If three wavelengths are present in the laser beam, and the separation between them satisfies Eq. (1), then the expected speckle contrast may be reduced approximately by a factor of $\sqrt{3}$. Therefore, the wavelength separation should be large enough to achieve the desired speckle contrast reduction. As noted below, on some screen surfaces, the wavelength separation between two visible-light speckle patterns needs to be only about 0.35-0.4 nm to make the patterns uncorrelated (independent) for speckle reduction purposes. In addition, theoretical calculations predict that with smaller wavelength separation such as 0.2-0.3 nm, which leads to partially correlated speckle patterns, some smaller but appreciable amount of speckle-contrast reduction may be achieved.

For human eyes, perceived speckle patterns are averaged effect over a certain time period (i.e., the response time of the human eye). If a laser can flip-flop its wavelength between two lines within this period, and the spectral separation between two lines satisfies Eq. (1), then a perceived speckle contrast reduction of $\sqrt{2}$ can be achieved. If a laser can switch its wavelength between three lines within this period, and the spectral separation between each pair of adjacent lines satisfies Eq. (1), a perceived speckle contrast reduction of $\sqrt{3}$ is expected. The response time of the human eye is on the order of about 30 ms to about 70 ms. A wavelength cycling period is the period in which all of the wavelengths outputted by the laser are cycled. The wavelength cycling period should be less than the response time of the human eye, or less than about 30 ms to about 70 ms.

Therefore, in a laser-beam scanning projector, if an optical system can switch its wavelength between two lines with a separation meeting Eq. (1) such that one frame is imaged by one wavelength and the next frame is imaged by another wavelength, a speckle contrast reduction of $\sqrt{2}$ is achieved. If an optical system switches its wavelength between three lines with an adjacent spectral peak separation meeting Eq. (1) for consecutive frames, then the expected speckle contrast reduction is by a factor of $\sqrt{3}$.

The laser should switch from one wavelength to another wavelength within the "blank" interval between two successive image frames (i.e., the inter-frame time). For example, in a laser-beam scanning projector system with a 60 Hz frame rate, the typical inter-frame time from the end of one frame to the beginning of the next frame is about 4 ms. Therefore, the pump wavelength of the laser should switch from one wavelength to another wavelength over a transition time that is less than 4 ms. It is noted that the optical system 100 may be incorporated into projector systems other than laser-beam scanning projectors, such as frame projectors systems (e.g., DLP projectors). As such, the inter-frame time may be longer than that of a laser-beam scanning projector. For example, a frame projector may project a plurality of successive image frames with each image frame having a different color (e.g., a red frame, a blue frame, and a green frame). The transition time of the laser 110 should be shorter than the inter-frame period between successive green frames (i.e., the color of the frame that is produced by a frequency-converted laser beam). In some embodiments, the transition time should be less than 30 ms.

Referring once again to FIG. 1, the optical source 110 is configured as a semiconductor laser that can be controlled to fast-switch the wavelength of its pump beam 120 between at least two fundamental spectral peaks separated by at least 0.2 nm, preferably 1 nm or more. The transition time between the two wavelengths should be less than the interval between two successive image frames (typically 4 ms). In the illustrated embodiment, a three-section 1060 nm DBR semiconductor laser 110 is used to pump a MgO-doped lithium niobate wavelength conversion device 130. The DBR laser 110 illustrated schematically in FIG. 1 comprises a wavelength selective section 112 (i.e., DBR section), a phase section 114, and a gain section 116. The wavelength selective section 112, which can also be referred to as the DBR section of the laser 110, typically comprises a first order or second order Bragg grating positioned outside the active region of the laser cavity. This section provides wavelength selection, as the grating acts as a mirror whose reflection coefficient depends on the wavelength. The gain section 116 of the DBR laser 110 provides the major optical gain of the laser and the phase section 114 creates an adjustable phase shift between the gain material of the gain section 116 and the reflective material of the wavelength selective section 112. The phase section 114 may also be used to reduce the thermal coupling between the gain section 116 and the DBR section 112 to control the pump-beam wavelength. The wavelength selective section 112 may be provided in a number of suitable alternative configurations that may or may not employ a Bragg grating.

Respective control electrodes 102, 104, 106, may be incorporated in the wavelength selective section 112, the phase section 114, the gain section 116, or combinations thereof, and are merely illustrated schematically in FIG. 1. It is contemplated that the electrodes 102, 104, 106 may take a variety of forms. For example, the control electrodes 102, 104, 106 are illustrated in FIG. 1 as respective electrode pairs but it is contemplated that single electrode elements 102, 104, 106 in one or more of the sections 112, 114, 116 will also be suitable for practicing particular embodiments of the present invention. The control electrodes 102, 104, 106 can be used to inject electrical current into the corresponding sections 112, 114, 116 of the laser 110. The injected current can be used to alter the operating properties of the laser by, for example, controlling the temperature of one or more of the laser sections, injecting electrical current into a conductively doped semiconductor region defined in the laser substrate, controlling the index of refraction of the wavelength selective and phase sections 112, 114 of the laser 110, controlling optical gain in the gain section 116 of the laser, etc.

Figure 3A:
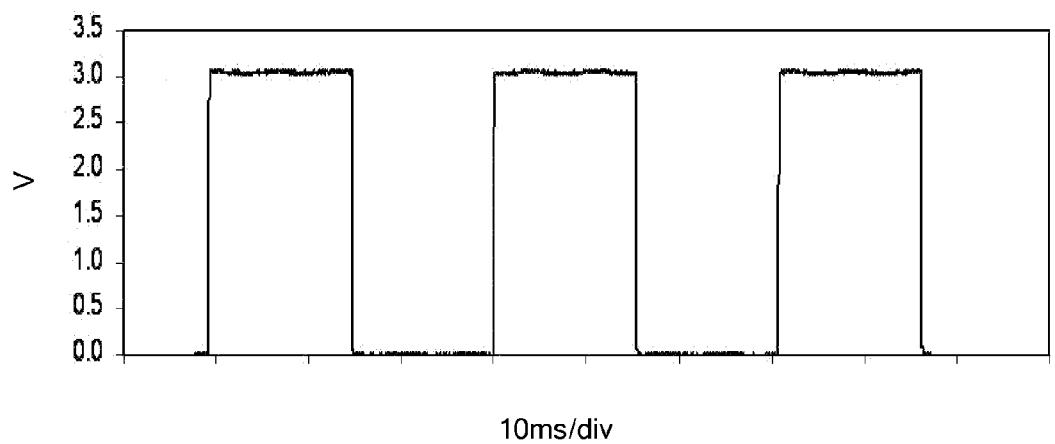
FIG. 3A is a graph depicting a square wave signal applied to a DBR heater of a DBR laser according to one or more embodiments shown and described herein.
Figure 3B:
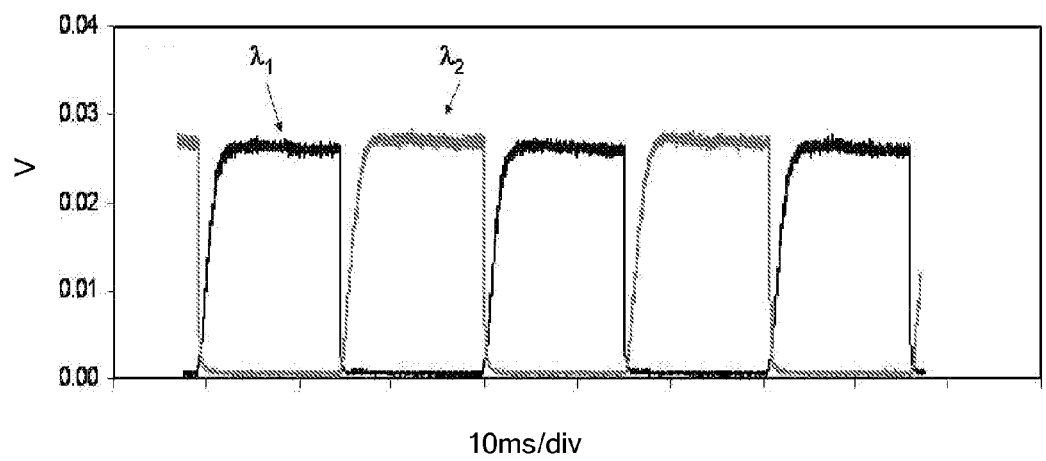
FIG. 3B is a graph depicting the optical output waveforms of a DBR laser driven by the square wave signal depicted in FIG. 3A.

In one embodiment, the DBR section control electrode 102 comprises a resistive heater that is configured to thermally change the refractive index and possibly the pitch of the grating of the DBR section 112. To obtain the fast switching of the wavelength of the DBR laser 110, an electrical square-wave signal is applied to the DBR resistive heater electrode to switch the output pump beam 120 of the laser 110 between two or more wavelengths. FIG. 3A depicts an exemplary square-wave signal applied to the resistive heater, while FIG. 3B depicts the waveforms of the laser 110 output pump beam 120 having a first wavelength $\lambda_1$ and a second wavelength $\lambda_2$. As shown in FIG. 3B, the pump beam 120 alternates between the first wavelength $\lambda_1$ and the second wavelength $\lambda_2$. The vertical axis of FIG. 3B is the intensity of the pump beam 120 in arbitrary units (A.U.). The frequency of the signal may be equal to the frame rate. For example, in one embodiment, the frequency of a square wave signal may be chosen at 65 Hz, which is close to the typical frame rate of a laser-beam scanning projector.

It should be understood that signals other than a square-wave signal may be applied to the resistive heater depending on the desired output of the laser 110 and the wavelength conversion device 130. For example, the optimum heater electrical signal may not be truly a square wave when a near-square-wave frequency-doubled output is desired. To achieve nearly square-wave wavelength changes in the output of the laser 110 with minimal transition time, the signal applied to the DBR section control electrode 102 may deviate from an ideal square-wave during the transition time. However, for the remainder of the switching period the electrical signal may be approximately constant. As an example and not a limitation, the rising edge of the heater electrical signal may reach a higher amplitude than the average amplitude of the waveform and then taper down to a flat plateau similar to that of a square-wave signal. Further, when the wavelength of the laser is controlled by heat, the wavelength change is proportional to heater power. When the operating point of the laser is changed (e.g., ambient temperature change, operational temperature change), the voltage bias and voltage amplitude of the signal may need to be changed to compensate. For example, when the laser is operated at different power levels, the amount of heat transferred from the gain section to the DBR section varies so that the heater control has to compensate to maintain the desired wavelength. Additionally, the heater resistance and/or efficiency may also change or time and temperature. To achieve an equivalent of power control rather than voltage or current, in some embodiments a square root operation may be applied to a computed control signal before it is applied to the driver circuit.

Figure 4A:
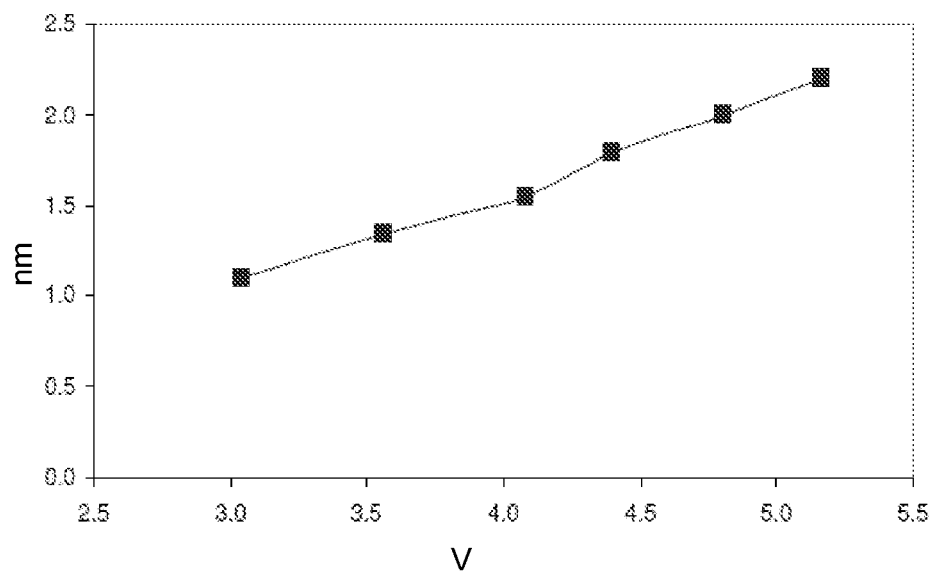
FIG. 4A is a graph depicting spectral separation between two switching wavelengths versus amplitude of a square wave applied to a DBR heater according to one or more embodiments shown and described herein.
Figure 4B:
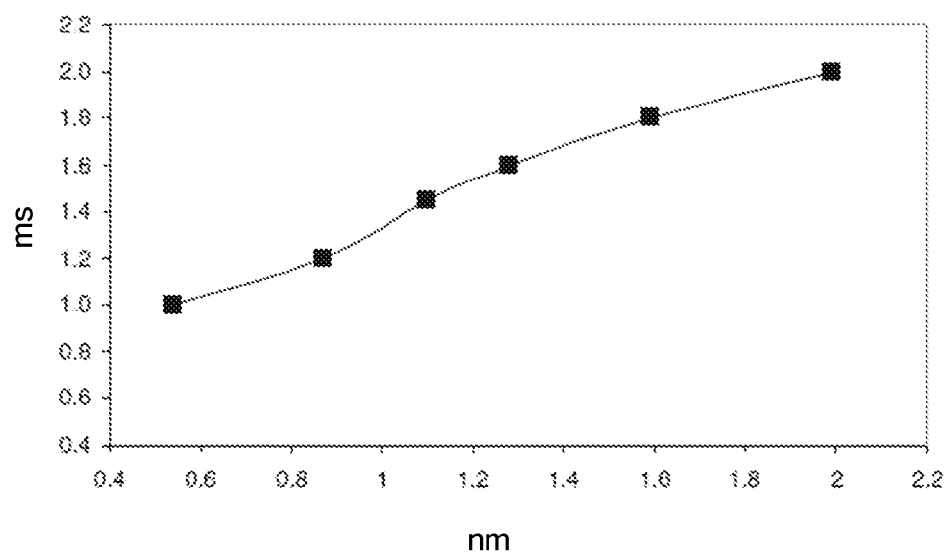
FIG. 4B is a graph depicting switching speed of a DBR laser versus wavelength separation according to one or more embodiments shown and described herein.

The spectral separation of the two wavelengths can be changed by adjusting the amplitude of the electrical square-wave signal. FIG. 4A illustrates the spectral separation between two switching wavelengths versus the amplitude of the square wave signal applied to the resistive heater of the DBR section 112. FIG. 4B illustrates the switching time versus the wavelength separation between the different wavelengths. It may be seen that the switching time between two wavelengths with 1 and 2 nm separations are approximately 1.4 ms and 2.0 ms, respectively. Both switching times are shorter than the typical 4-ms interval between two frames in a laser-beam scanning projector. Therefore, the wavelength of the laser 110 may be switched by applying a modulation signal (e.g., a square-wave signal) to a heater associated with the DBR section 112 to thermally change the refractive index and possibly the pitch of the grating.

Figure 5:
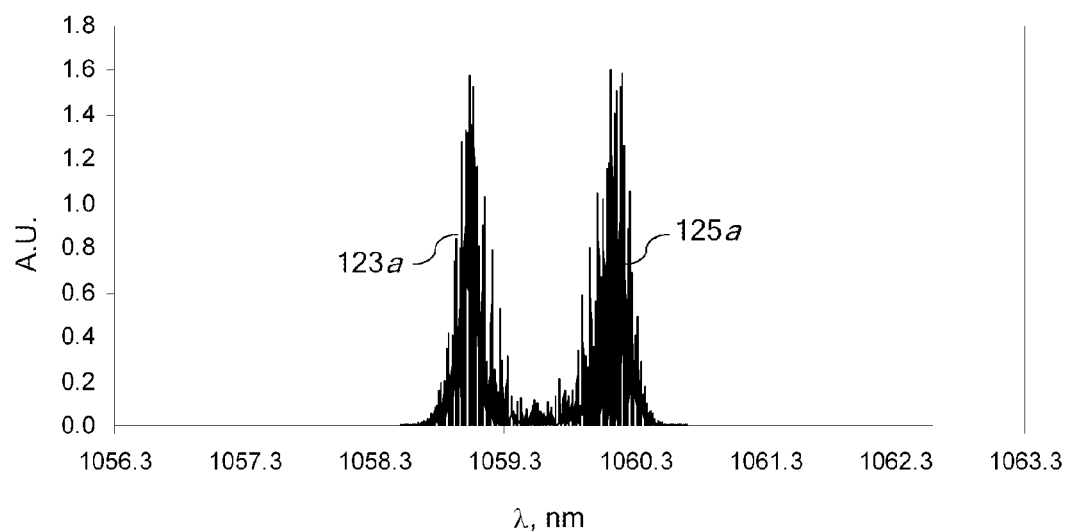
FIGS. 5 and 6 are graphs depicting an optical spectrum of a pump beam having two fundamental spectral peaks according to one or more embodiments shown and described herein.
Figure 6:
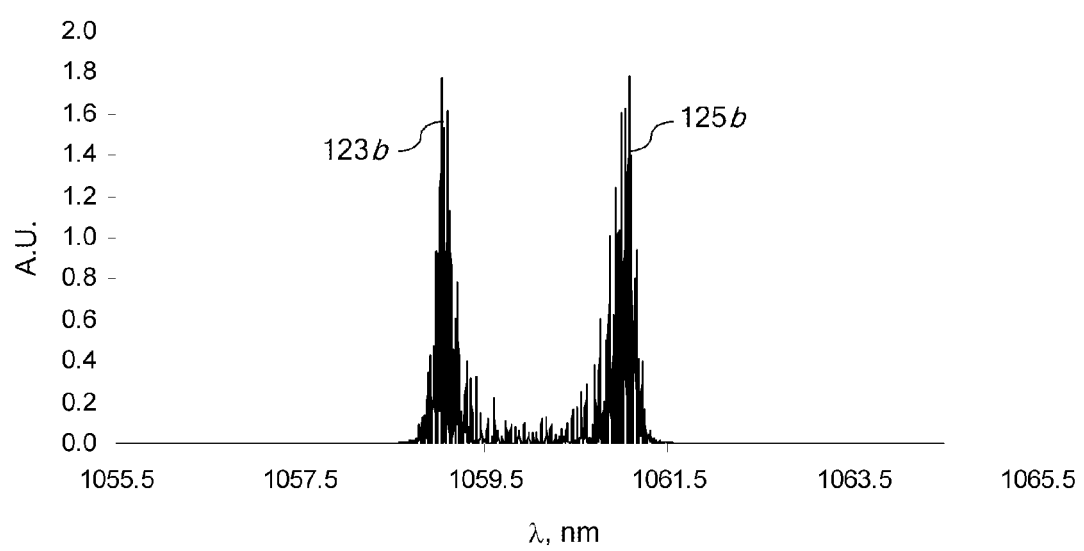

FIG. 5 depicts an output optical spectrum of a wavelength-switched three-section DBR laser comprising a first fundamental spectral peak 123a at a first wavelength $\lambda_1$=1059.04 nm and a second fundamental spectral peak 125a at a second wavelength $\lambda_2$=1060.17 nm separated from $\lambda_1$ by 1.1 nm (8 measurements averaged). As an example and referring once again to FIGS. 3A and 3B, it may be seen that the switching time between two wavelengths is about 1.5 ms. An output optical spectrum of the laser with its wavelength switching between a first fundamental spectral peak 123b and a second fundamental spectral peak 123b with 2-nm spectral separation is shown in FIG. 6.

In another embodiment, the wavelength of the three-section DBR laser may be switched by injecting a modulated electrical current into the DBR section 112. Because of carrier-induced refractive-index-change effect, the wavelength reflected by the DBR grating can be modulated by the injection current. The shift ($\Delta\lambda_B$) of the Bragg wavelength ($\lambda_B$) can be expressed in terms of the shift ($\Delta n_d$) of the refractive index of the DBR section ($n_d$) as:

$$\Delta\lambda_B = \frac{\Delta n_d}{n_d}\lambda_B, \qquad \text{Eq. (2).}$$

The change of the refractive index ($\Delta n_d$) with the carrier density of the DBR section $N_d$ is given by:

$$\Delta n_d = \Gamma \frac{dn_d}{dN_d} N_d, \qquad \text{Eq. (3),}$$

where $\Gamma$ is the optical confinement factor and $dn_d/dN_d$ is the material coefficient which describes the free-carrier plasma effect. The carrier density related to the injection current (I) may be expressed as:

$$\frac{dN_d}{dt} = \frac{1}{eV_d - \frac{N_d}{\tau_e}} - BN_d^2 - CN_d^3, \qquad \text{Eq. (4),}$$

where $V_d$, $\tau_e$, B, and C are the waveguide volume of the DBR section, carrier lifetime, radiative, and Auger recombination coefficients in the passive waveguide, respectively. The carrier lifetime in the passive waveguide is typically on the order of 10 ns. The switching time between wavelengths with a few nanometer spacing is hence on the order of about 10 ns. This switching time is much shorter than typical 4 ms interval between two frames. Therefore, to reduce the appearance of speckle, the wavelength of the laser 110 may also be switched by applying current injection into the DBR section 112.

Referring once again to FIG. 1, the wavelength-conversion device 130 may be configured as second harmonic generation (SHG) crystal with multiple phase matching peaks that match the wavelengths of the fundamental spectral peaks of the pump beam 120. The wavelength-conversion device 130 may comprise a birefringent crystal to provide birefringent phase matching, or a non-linear optical medium that is poled at a quasi-phase-matching (QPM) periodicity to quasi-phase-match the frequency of up-converted light produced at different locations along the propagation direction. Although embodiments are described hereinbelow in the context of QPM, it should be understood that other phase-matching techniques may be utilized (e.g., birefringent phase matching by the use of birefringent crystals, or inter-modal phase-matching based on balancing the inter-modal dispersion in a waveguide against the material dispersion).

In one embodiment, the wavelength conversion device 130 comprises an SHG crystal with multiple sections in which each section is uniformly poled to quasi-phase match one of the fundamental spectral peaks. In another embodiment, the wavelength conversion device 130 comprises a non-uniformly (i.e., aperiodically) poled SHG crystal according to a proper design to simultaneously QPM all the wavelengths of all of the fundamental spectral peaks produced by the laser 110. Both embodiments may be mathematically described using a model of a nonlinear medium in which the phase-matching or quasi-phase matching is manipulated by phase-modulating the nonlinear polarization along the wavelength-conversion device according to a phase-modulating function (PMF) which may be continuous or discrete. Phase-modulation of the nonlinear polarization results in phase modulation of the nonlinear optical response.

As shown in FIG. 1, the pump beam may be focused and directed toward the wavelength-conversion device by coupling optics 121. In the embodiment shown in FIG. 1, the coupling optics generally comprises a first lens 122a that collimates the pump beam 120 emitted by the semiconductor laser 110 and a second lens 122b that focuses the pump beam 120 into the waveguide portion 137 of the wavelength conversion device 130. However, it should be understood that other coupling methods and devices may be used. Further, the wavelength-conversion device 130 may comprise a bulk nonlinear optical material, and it may be incorporated into the laser as an intra-cavity wavelength conversion device. The lenses may be coupled to an actuator (not shown) for adjusting the position of the lenses in the x- and y-directions such that the positions of the lenses are adjustable. Adjusting the position of the lenses in the x- and y-directions may facilitate positioning the pump beam 130 along the input facet 131 of the wavelength conversion device and, more specifically, on the waveguide portion 137 of the wavelength conversion device 130, such that the pump beam is aligned with the waveguide portion 137 and the frequency-converted output beam 140 of the wavelength conversion device 130 is optimized. Although the optical system illustrated in FIG. 1 has a substantially linear orientation, other orientations and configurations are also possible. For example, the semiconductor laser 110 and wavelength conversion device 130 may be oriented such that the optical path of the pump beam 120 and frequency-converted output beam 140 is a folded optical path.

The wavelength conversion device 130 may include a nonlinear optical medium with phase-modulated nonlinear response, such that the spectrum of its nonlinear optical response contains multiple phase-matching peaks, properly spaced in wavelength to provide phase-matching for SHG of green wavelengths spaced adequately for speckle reduction. The phase-modulation of the nonlinear response may be obtained by modulating the nonlinear, linear, or both optical properties of the nonlinear optical medium used for optical-frequency mixing.

A waveguide portion 137 of the wavelength conversion device 130 extends from the input facet 131 to an output facet 138. The wavelength conversion device 130 may comprise a crystal formed of a nonlinear optical material having a plurality of domains with alternating sign of the nonlinear optical response. Nonlinear optical materials suitable for a wavelength conversion device 130 may include, but are not limited to, poled doped or non-doped lithium niobate, poled doped or non-doped lithium tantalate, and poled doped or non-doped potassium titanyl phosphate (KTP), for example.

The light propagation in the wavelength conversion device 130 may be bulk or optical waveguide propagation. The wavelength conversion device 130 may comprise a crystal utilizing a method of phase-matching, including, but not limited to, birefringent, inter-modal, or quasi-phase-matching. The role of phase-matching is to produce constructive interference of the electromagnetic waves at the frequency-converted optical frequency generated by the nonlinear polarization produced by the fundamental optical field along the optical path. The phase-modulation of the nonlinear response serves to distribute the phase-matching into several phase-matching peaks, corresponding to different optical frequencies, such that each of the phase-matching peaks provides partial phase-matching. The term partial here means that for a particular optical frequency corresponding to such a partial phase-matching peak, the frequency of up-converted optical waves produced by some, but not necessarily all regions along the crystal, interfere constructively to produce substantially non-zero up-converted signal on the output. The phase-modulation thus reduces the maximum phase-matching at the optical frequency of the frequency-conversion process phase-matched in the basic, un-modulated design to partial phase-matching or no phase-matching, while at the same time allowing partial phase-matching at other optical frequencies for which no phase-matching was provided by the un-modulated design.

In the low-conversion limit, the spectrum of the phase-modulated phase-matching response to a tuned monochromatic input signal is proportional to the Fourier-transform of the phase-modulating function (PMF), irrespective of the physical mechanism used for phase matching. At high-level of energy conversion to the up-converted frequency range, the spectrum of the up-converted signal deviates from the Fourier-transform of the PMF. In many cases, this deviation may lead to a minor deterioration in the speckle contrast reduction. If this deterioration becomes important, the magnitude ratio of the phase-matching peaks may be adjusted by changing the PMF such that the spectral response at high conversion leads to better reduction of speckle contrast, while the speckle contrast at lower conversion may be somewhat higher, e.g., when maximum speckle reduction may be more important at higher optical power.

The PMF imparts spatially varying phase on the frequency up-converted optical field. This is achieved by modulating the phase or spatial location of the nonlinear polarization (for example by modulating the poling of quasi-phase matching crystals) and/or by modulating the phase delay of up-converted waves generated at different locations along the crystal by modulating the (effective) refractive index of the medium or optical path length that they traverse. Some of the techniques for phase modulation, such as longitudinal shifting of the positions of inverted domains of quasi-periodic poling, may be interpreted as embodiments of the nonlinear or linear path of modulation.

Generally, the nonlinear medium is designed to allow phase-matching for second harmonic generation (SHG) of two or more optical frequencies, e.g., $2\omega_1$, $2\omega_2$, $2\omega_3$, etc. Therefore, the time-averaged frequency-converted output may comprise two or more frequency-converted spectral peaks having frequencies of $2\omega_1$, $2\omega_2$, $2\omega_3$, and so on.

Figure 7:
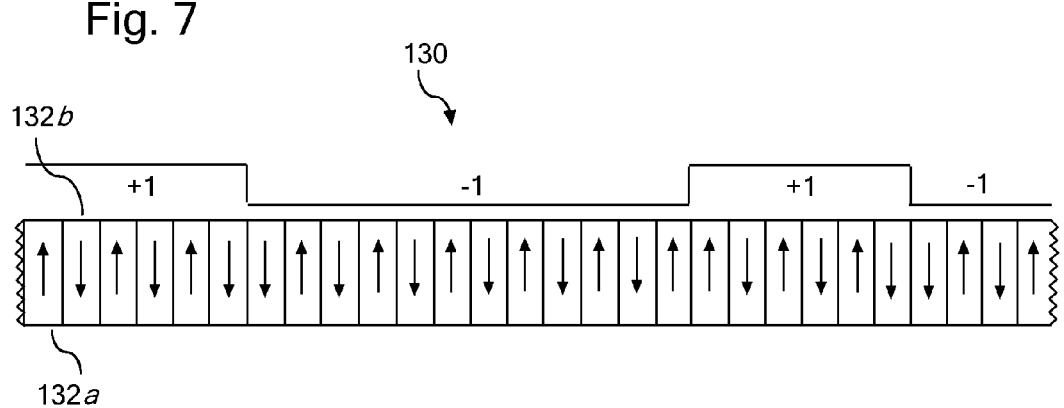
FIG. 7 is a schematic diagram of a wavelength conversion device having a phase-modulated periodicity defined in part by a discrete phase modulation function according to one or more embodiments shown and described herein.

Referring to FIG. 7, quasi-phase matching may be achieved by introducing periodic or quasi-periodic sign reversal of the nonlinear optical response, for example, by quasi-periodically inverted ferroelectric domains 132a, 132b within the nonlinear optical material (e.g., within the waveguide region of the crystal) of the wavelength conversion device 130. The quasi-periodic poling provides the quasi-periodic inverting of the sign of the nonlinear coefficient of the wavelength conversion device in order to ensure constructive addition of the nonlinear optical response at the frequencies of interest generated along the device length.

As illustrated in FIG. 7, the domains may have either positive (e.g., 132a) or negative (132b) nonlinear polarization associated therewith. The sign of the nonlinear response of the domains may alternate approximately periodically along a longitudinal length of the crystal. As described in more detail below, the periodicity of the plurality of poling domains may be phase-modulated such that the domains are quasi-periodically poled. It is noted that the size of the quasi-periodic domains is exaggerated in FIG. 7 for illustrative purposes. Further, the wavelength conversion device is only partially illustrated in FIG. 7.

Wavelength conversion devices utilized for second harmonic generation are poled at a phase-matching periodicity to phase-match the frequency up-converted light produced at different locations along the propagation direction. To illustrate, the spectral intensity response of a QPM structure with periodically inverted ferroelectric domains in lithium niobate with a fixed phase-matching period $\Lambda$ has QPM peaks in wave-vector space at $m2\pi\Lambda$ where $m=1, 2, 3, \ldots$. The QPM peak characterized by $m=1$ has the highest magnitude of each of the QPM peaks. The relative magnitude of intensity of the QPM peaks corresponding to different orders m decreases as $1/m^2$. Therefore, for most efficient QPM, the QPM peak with $m=1$ should be matched to the infrared wavelength of the pump beam emitted by the semiconductor laser to produce a frequency-converted output beam. It should be understood that the phase-matching concepts described below may also be applied to phase-matching techniques other than quasi-phase-matching (e.g., birefringent or inter-modal phase matching).

For illustration purposes, QPM may be described in wave-vector (k-vector) space. The source of frequency-converted radiation is the nonlinear dielectric polarization at the up-converted (doubled) frequency. At a particular moment in time, the phase distribution of this source wave at an example frequency $2\omega$ along the propagation direction can be described with a wave-vector $2k_\omega = 2\omega n_\omega/c = 4\pi n_\omega/\lambda_\omega$, where c is the speed of light, $\lambda_\omega$ is the wavelength in vacuum of an optical wave with frequency $\omega$, and $n_\omega$ is the refractive index of the nonlinear optical medium at the optical frequency $\omega$ of the pump wave producing the nonlinear polarization. In the case of waveguide propagation and interaction, $n_\omega$ is the effective index of the waveguide mode used to describe the propagation of the fundamental-frequency (pump) wave causing the nonlinear polarization. At the same time, the free-propagating frequency-converted light at frequency $2\omega$ generated at any location along the propagation direction can be described by a plane wave with wave-vector $k_{2\omega}=2\omega n_{2\omega}/c=2\pi n_{2\omega}/\lambda_{2\omega}=4\pi n_{2\omega}/\lambda_\omega$, where $n_{2\omega}$ is the (effective) refractive index of the medium at the second harmonic frequency $2\omega$, and $\lambda_{2\omega}=\lambda_\omega/2$ is the wavelength in a vacuum of the second harmonic. It should be understood that free-propagating frequency up-converted light also includes the case of waveguide propagation, where the optical wave is confined in the transverse dimensions. If the wave-vector of the source wave is the same as the wave-vector of the free-propagating waves, then constructing interference of the generated second harmonic waves is observed along the device length, and the second harmonic power grows. Otherwise, the second harmonic power oscillates along the length, reaching only a small maximum value dictated by the wave-vector mismatch $$\Delta k = k_{2\omega} - 2k_\omega, \quad \text{Eq. (5).}$$

In cases where $\Delta k$ is non-zero, one way to allow the second harmonic power to grow is to use quasi-phase matching as described above. A periodic reversal of the sign of the nonlinear coefficient with period $\Lambda$ and associated k-vector $K_g = 2\pi/\Lambda$ leads to a periodic compensation of the phase mismatch caused by $\Delta k$. Quasi-phase matching is achieved when:

$$k_{2\omega} - 2k_\omega \pm mK_g = 0, \quad \text{Eq. (6),}$$

whereby the wave-vector mismatch is compensated. Here m can be any integer and signifies the quasi-phase matching order.

As defined by Eq. 5, associated with each fundamental optical wavelength $\lambda_\omega$ is a wave-vector mismatch $\Delta k$ for frequency doubling of the related optical field. In the case of type-I quasi-phase matching for utilizing the $d_{33}$ nonlinear coefficient of lithium niobate, when the fundamental wavelength is on the order of 1060 nm, $\Delta k$ is significant, on the order of 9000 cm$^{-1}$. In other cases of phase-matching, such as birefringent phase-matching, $\Delta k$ is 0. When describing QPM device design in terms of a carrier periodicity and its phase modulation, it may be convenient to define in k-vector space a deviation k-vector by the equation:

$$\delta k = \Delta k \pm K_c, \quad \text{Eq. (7),}$$

where $K_c$ is the wave-vector describing the carrier periodicity of QPM. The plus/minus sign in the right-hand-side of Eq. 7 is chosen such that $\delta k=0$ when the phase-matching is not modulated. Since for a particular design of the nonlinear device the detuning from the central (design) optical frequency determines the associated phase mismatch, the spectral response of a nonlinear optical device may be designed and plotted as a function of $\delta k$. In addition, description of the spectral response due to a particular PMF in terms of $\delta k$ is generally valid for all types of phasematching, not only for QPM.

The mapping between $\delta k$ and the fundamental wavelength may be given by the relations:

$$\frac{d\Delta k}{d\lambda_\omega} \equiv \frac{d\delta k}{d\lambda_\omega} = -\frac{4\pi}{\lambda_\omega^2}(n_{2\omega}^g - n_\omega^g), \quad \text{Eq. (8),}$$

where $n^g_\omega$ and $n^g_{2\omega}$ stand for the group index at the fundamental and at the second harmonic frequencies. Group index at frequency ω or wavelength λ may be defined as:

$$n^g = n + \omega \frac{dn}{d\omega} = n - \lambda \frac{dn}{d\lambda}, \quad \text{Eq. (9).}$$

Typical values of $d\Delta k/d\lambda$ for reverse-proton exchanged waveguides in MgO-doped lithium niobate are about 28.6 cm$^{-1}$/nm. For ridge waveguides confined in an MgO-doped slab sandwiched between layers with low refractive index, such as silicon dioxide, typical values of $d\Delta k/d\lambda$ are about 26.4 cm$^{-1}$/nm.

A truly periodically poled device of length L will have a spectral response curve in terms of δk described with a sinc$^2$ function with a full-width at half-maximum (FWHM) equal to 1.772π/L. In terms of fundamental wavelength, the FWHM is then:

$$\Delta\lambda_{FWHM} = \frac{0.443}{n^g_{2\omega} - n^g_\omega} \frac{\lambda^2}{L}, \quad \text{Eq. (10).}$$

Utilizing the above, wavelength conversion devices of the present disclosure convert the frequency of a pump beam hopping between at least two fundamental spectral peaks into an output beam similarly hopping between at least two frequency-converted (frequency-doubled) spectral peaks. Therefore, the wavelength conversion device should provide two or more phase matching peaks with approximately equal peak conversion efficiency (since it is desired that the output power does not change when the wavelength is changed). Focusing on one of the phase-matching spectral peaks described above with respect to second harmonic generation by quasi-phase matching (using QPM order m=1 for example), its shape can be changed from a single peak to a split peak with multiple spectral components by altering the character of the QPM crystal domain structure from strictly periodic at the phase-matching periodicity Λ to a quasi-periodic structure. Several techniques for manipulating the shape of the QPM peak may be utilized, including, but not limited to, QPM gratings with frequency chirp, periodic or aperiodic superlattice, quasi-periodic superlattice, non-periodic superlattice, and phase modulation. Additionally, techniques may utilize computer optimization to obtain a QPM structure with a desired spectral response by utilizing the Fourier-transform relation between the spectral response and the distribution of nonlinear susceptibility in the physical space.

Figure 8A:
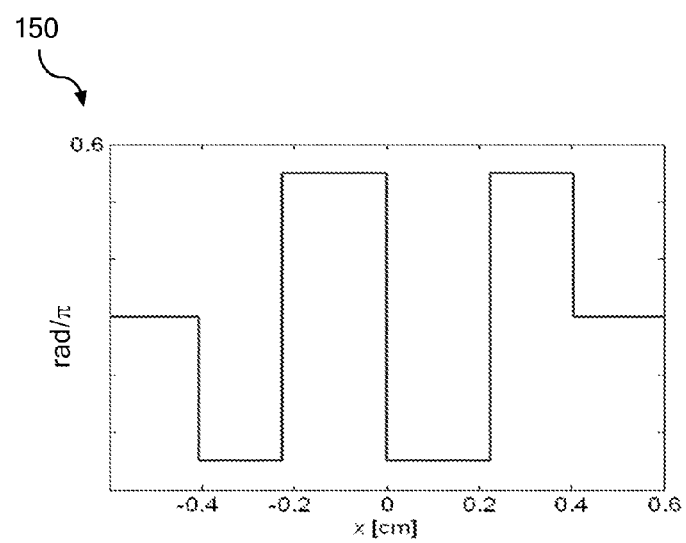
FIG. 8A is a graph depicting a discrete phase modulation function according to one or more embodiments shown and described herein.
Figure 8B:
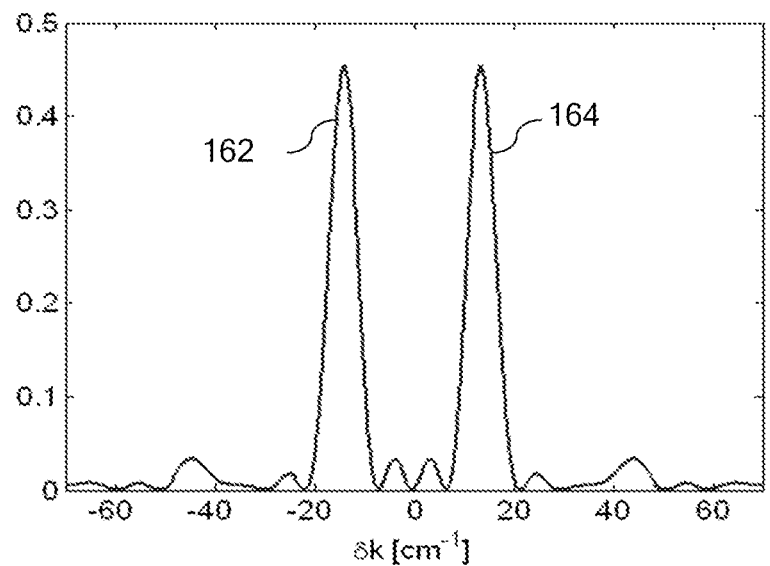
FIG. 8B is a graph depicting a spectral response in wave-vector space of a wavelength conversion device having a phase-modulated periodicity defined in part by the discrete phase modulation function illustrated in FIG. 8A according to one or more embodiments shown and described herein.
Figure 8C:
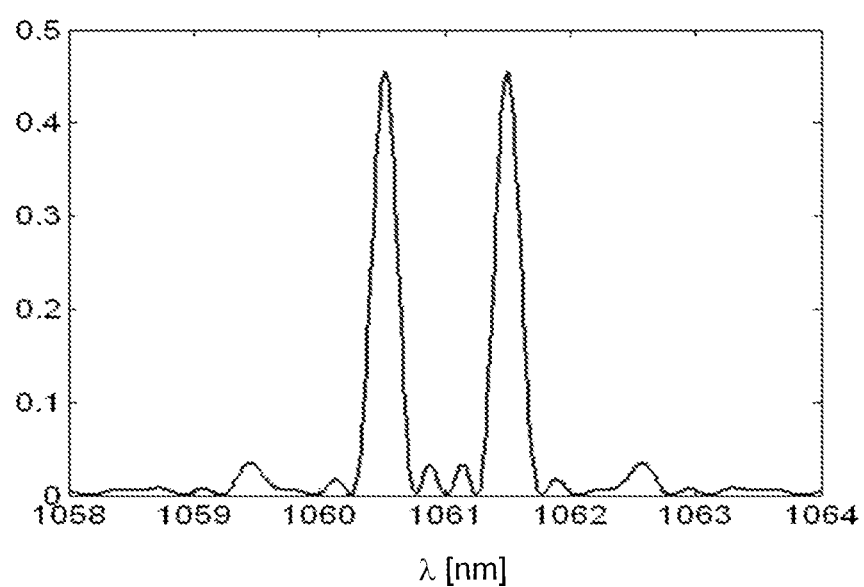
FIG. 8C is a graph depicting a wavelength spectral response of a wavelength conversion device having a phase-modulated periodicity defined in part by the rectangular phase modulation function illustrated in FIG. 8A according to one or more embodiments shown and described herein.

Referring generally to FIGS. 8A-8C, a discrete sign-flip PMF for a two-peak QPM spectral response with optimized SHG efficiency and the corresponding spectral response of a wavelength conversion device in terms of δk and wavelength according to one embodiment are illustrated. The spectral response is characterized by at least two phase matching peaks (e.g., quasi-phase matching peaks): a first quasi-phase matching peak 162 and a second quasi-phase matching peak 164. The first quasi-phase matching peak 162 corresponds to a first frequency-converted spectral peak having a frequency of $2\omega_1$ produced by second harmonic generation, and the second quasi-phase matching peak 164 corresponds to a second frequency-converted spectral peak having a frequency of $2\omega_2$ produced by second harmonic generation. The magnitudes of these quasi-phase matching peaks are approximately equal. It should be noted that the value of the PMF outside the QPM region is zero since no phase is imparted. The effective nonlinear response outside the QPM region is also zero. It should be understood that in all plots where the PMF is shown to equal zero outside a central region of the plot occupied by the QPM region, the effective nonlinear response is also zero outside of that QPM region (see FIGS. 8A, 9A, 10A, 11A, 12A, and 14A).

Modulation of the phase-matching periodicity may be utilized to obtain a wavelength conversion device having two or more spectral peaks having approximately equal SHG response to produce frequency-converted spectral peaks having substantially equal average power. Average power is used herein as the average optical power of the beam on a projection surface as viewed by an observer. The wave-vector mismatch Δk between the infrared (fundamental) and converted (second harmonic) light is several thousand cm$^{-1}$. To compensate for this mismatch, a periodic poling with a short quasi-phase matching period Λ and a wave-vector $K_c$ of several thousand cm$^{-1}$ matching Δk may be required to eliminate the phase mismatch. The result would be a single spectral peak centered at δk=0. The quasi-phase matching period Λ may be referred to as the underlying carrier periodicity, and $K_c$ may be called the carrier wave-vector.

To obtain multiple quasi-phase matching peaks, a phase modulation function (PMF) may be applied to the carrier periodicity to achieve a phase-modulated periodicity. The phase-modulated periodicity, when applied to the nonlinear optical material in the form of quasi-periodic poling domains, has the effect of splitting the single spectral peak centered at δk=0 into multiple spectral peaks, thereby producing side bands (e.g., phase-matching peaks 162, 164) equally spaced in wave-vector and adjacent to the center spectral peak. The inverted domains are referred to as quasi-periodic because the plurality of domains as a whole is not truly periodic when modulated by the PMF. The PMF has a very large period compared with the QPM period Λ (i.e., the carrier periodicity) and therefore a much smaller k-vector. The PMF introduces a small perturbation on the relative positions of the poling domains. As an example, if the side spectral peaks are desired to be 28 cm$^{-1}$ from the central quasi-phase matching peak, a modulation with a k-vector of 28 cm$^{-1}$ may be applied. To apply the phase-modulation function to the periodic poling, the positions of all inverted domains along the propagation direction may be shifted by a distance proportional to the local value of the PMF. The proportionality constant is such that a phase shift of π dictated by the PMF corresponds to a longitudinal shift of 0.5Λ for the inverted domain. If the phase-modulating function is f(x), then the longitudinal shift of the position of the inverted domain at location x along the propagation direction is Λf(x)/(2π). It is to be understood that a description of the same device implementation may be given in terms of frequency (period) modulation.

If the pump spectral peaks are symmetrically located around a center-wavelength λ and spaced in (vacuum) wavelength by Δλ, then a periodic PMF that can split the phase-matching peak into components that will allow the generation of up-converted radiation at wavelengths 0.5(λ−0.5Δλ), 0.5λ, and 0.5(λ+0.5Δλ) should have a period of:

$$\Lambda_{PM} = \frac{2\pi}{K_{PM}} = \frac{\lambda^2}{\Delta\lambda(n^g_{2\omega} - n^g_\omega)}, \quad \text{Eq. (11).}$$

It is to be understood that the periodic phase-modulation is only one of a variety of phase-modulating functions that may be utilized for effective speckle reduction. Though the periodic phase-modulation can provide near-optimum response in terms of compromise between speckle reduction and conversion efficiency, other, aperiodic PMF's may also be used to produce multi-peak up-conversion spectral response, where the positions and magnitudes of the quasi-phase matching peaks may be slightly altered compared to the periodic modulation case, while still providing adequate performance for substantial speckle reduction. It is the adequate wavelength spacing and the balance of magnitudes of the quasi-phase matching peaks that may provide optimized speckle reduction and conversion efficiency.

In an alternative embodiment, a phase-modulating function can be applied to the effective refractive index, without interfering with the periodic poling. For example, by varying the width, thickness, or refractive index dispersion of the waveguide (in case of waveguide interaction) $\delta k$ may be varied periodically, thereby producing multiple quasi-phase-matching peaks in the spectral response without altering the truly periodic poling. This technique may also be applied for phase-matched interactions relying on other means than periodic sign reversal of the nonlinear coefficient, such as birefringent phase-matching or intermodal phase-matching (where waveguide dispersion is used to compensate material dispersion).

In the case of bulk crystals with birefringent phase-matching or with QPM, periodic variation of the refractive index by temperature, stress, or electric field can also be applied for continuous phase modulation. The modulation of linear optical properties may be produced by material composition, temperature, electric field, mechanical stress, or other stress factors. In the case of waveguide propagation, periodic modulation of a waveguide property such as the waveguide width, thickness, or material composition, can effect periodic modulation of phase-matching via the effect on the effective indices of the optical modes.

In another embodiment, multiple crystals may be stacked in a sequence along the direction of light propagation, separated by thin layers of optically transparent material. The thickness of a separating layer is selected to provide a phase-difference of $(2i+1)\pi$ between the fundamental and the up-converted optical frequencies for discrete phase-modulation, where $i=0, 1, 2, 3 \ldots$. If the phase-difference is not an integer number of $\pi$, then a more-general PMF with rectangular phase-modulation may be obtained. Alternatively, blocks of different media can be stacked together, with different nonlinear and linear optical properties, leading to modulation of the phase-matching.

Referring specifically now to FIGS. 8A and 8B, one embodiment of a phase modulation function and resulting plurality of poling domains having a phase-modulated periodicity is illustrated. FIG. 8A illustrates a discrete PMF 150 that consists of a rectangular wave. The discrete PMF 150 effectuates a large-period sign reversal sequence. Every sign reversal is equivalent to a discrete phase jump of $\pi$. For the case of QPM via periodic poling, this periodic sign reversal is superimposed on the periodic poling with phase matching period $\Lambda$. As illustrated in FIG. 7, sign reversal of the nonlinear coefficient is equivalent to dielectric polarization reversal in a ferroelectric crystal such as lithium niobate. The periodic sign flip is achieved by flipping the orientation of one or more domains with respect to their nominal orientation as characterized by the truly periodic poling with phase matching period $\Lambda$.

The wavelength conversion device illustrated and characterized by FIGS. 8A-8C is an 8.1 mm-long quasi-periodically poled lithium niobate waveguide. The discrete PMF 150 has a period of sign-reversal of about 4.5 mm. Phase-matching is not provided outside of the 8.1-mm long region. Mathematically, the nonlinear optical coefficient outside of the phase-matched region can be assumed 0 even if the nonlinear medium extends outside of that region. The duty cycle of the discrete PMF 150 may be altered to achieve the desired spacing and magnitude of the quasi-phase matching peaks and corresponding two or more frequency-converted spectral peaks. The duty cycle of the discrete PMF of the embodiment illustrated in FIG. 8 is approximately 0.5 to achieve the frequency response with fully suppressed central peak at $\delta k=0$.

As stated above, FIG. 7 illustrates an example of a portion of the plurality of domains of a wavelength conversion device 130. It is to be understood that FIG. 7 is not drawn to scale and is for illustrative purposes only. Referring to FIGS. 7 and 8A, domains having a first crystallographic orientation 132a (assigned a positive sign) are indicated by an up-arrow ↑ while domains having a second crystallographic orientation 132b (e.g., a negative sign) are indicated by a down-arrow ↓. Referring to FIG. 8A, x=−0.405 on the x-axis corresponds to the beginning of the phase-matching region of the wavelength conversion device while x=0.405 is the end of the phase-matching region of the wavelength conversion device. In the regions characterized by a positive (+1) sign, the domains alternate periodically in accordance with the phase matching period $\Lambda$. However, at the transition locations the sign or orientation of the domains is flipped. As illustrated in FIG. 7, the domains in regions with sign −1 have a crystallographic orientation flipped compared to the periodic orientation that would have been present if the strict periodicity defined by the regions with sign +1 were maintained. The inverted domains in the regions with sign −1 are phase-shifted by $\pi$ with respect to normal positions as defined by the phase matching period $\Lambda$ (i.e., the carrier periodicity). The inverted domains in the regions with sign −1 are shifted longitudinally along x by $0.5\Lambda$ (which in this case is equivalent to flipping the orientation (inverting the sign) of the domains in the region to be phase-shifted).

FIG. 8B illustrates the spectral response of a wavelength conversion device that is poled at a phase-modulated periodicity that is defined by a phase matching period $\Lambda$ and modified by multiplying the periodic domain sign sequence by the PMF depicted in FIG. 8A. The domain width of each domain is approximately 3.2 µm. The wavelength conversion device incorporates an MgO-doped congruent lithium niobate waveguide and quasi-phase matching is used to allow type I phase-matching using the $d_{33}$ component of the second-order nonlinear susceptibility. The spectral response is illustrated in FIG. 8B as a function of $\delta k$. The magnitude of the two main quasi-phase matching peaks 162, 164 is about 0.455 relative to the magnitude of a single phase-matching peak produced by a truly periodic QPM device of the same 8.1-mm length. The additional smaller quasi-phase matching peaks do not contribute to the frequency-converted output. The two main quasi-phase matching peaks are separated by 27.9 cm$^{-1}$ in $\Delta k$-space. These quasi-phase matching peaks would quasi-phase match the frequency doubling of two corresponding infrared wavelengths around 1061 nm that are separated by about 1 nm in wavelength. Assuming that the laser power P hops in frequency between the two pump spectral peaks, each single-longitudinal-mode, the overall efficiency of the second harmonic generation may be given by:

$$P_{out}=0.455\eta_0 P^2, \quad \text{Eq. (12)},$$

where $\eta 0$ is the second harmonic generation efficiency of a uniformly periodically-poled quasi-phase matching grating of the same length with a single quasi-phase matching peak using a pump laser with a single longitudinal mode. If the factor of 0.455 renders the conversion efficiency too low, the efficiency may be recovered by increase of the peak power in pulsed operation. The external conversion efficiency of the nonlinear optical device, defined as the ratio of the average power of the frequency up-converted output signal and the average fundamental (pump) input power, may be an important parameter describing the performance of nonlinear device as part of the overall optical system. The external conversion efficiency is proportional to pump power in the low-conversion regime and saturates at high conversion. A factor of 2.2 of external efficiency decrease may be compensated by increasing the peak fundamental power by a factor of 2.2 or more. In addition, an additional factor of 1.4-2 should be applied when the pulse shape is not rectangular, but a more typical laser pulse shape such as Gaussian, hyperbolic secant, or Lorentzian.

A PMF represented by a periodic sign reversal with period $\Lambda_{PM}$ and 50% duty cycle leads to splitting of the QPM spectral peaks into two components, each having a relative magnitude of approximately 0.40-0.41 compared to a truly periodic QPM structure of the same length. In cases where the length of the QPM structure equals only a few periods of the PMF, deviations of the relative magnitude from 0.40-0.41 can be observed, depending on how the PMF is truncated at the ends of the QPM structure. Optimum truncation with the highest utilization of the nonlinear optical response among the two desired QPM peaks occurs when the PMF is symmetric with respect to the center of the QPM structure and the length L of the QPM structure equals approximately $(m+0.27)\Lambda_{PM}$, where m is positive integer. For example, when $L=(m+0.3)\Lambda_{PM}$, the relative response magnitude of the two peaks is about 0.474, 0.442, 0.431, and 0.424 for the cases m=1, 2, 3, and 4, respectively. Near-optimum truncation with substantially better than average utilization of the nonlinear response occurs when L is in the range between about m+0.10 and about m+0.45. Generally favorable truncation occurs when L is within the range between about m−0.05 and about m+0.55. Optimum truncation also occurs when the PMF is anti-symmetric with respect to the center of the QPM structure and the length L of the QPM structure equals approximately $(m+0.77)\Lambda_{PM}$ (or, equivalently, m−0.23)$\Lambda_{PM}$, where m is positive integer. Near-optimum truncation of anti-symmetric PMF occurs when L is in the range between about m+0.60 and about m+0.95. Generally favorable truncation of anti-symmetric PMF occurs when L is in the range between m+0.45 and m+1.05 (or, equivalently, between m−0.45 and m+0.05). Such is the case depicted in FIG. 8A, where L=1.8 $\Lambda_{PM}$. A PMF function with sign flip and 50% duty cycle is particularly beneficial for generating even numbers of spectral peaks, especially 2 peaks, because it allows complete suppression of the central peak at δk=0.

Figure 9A:
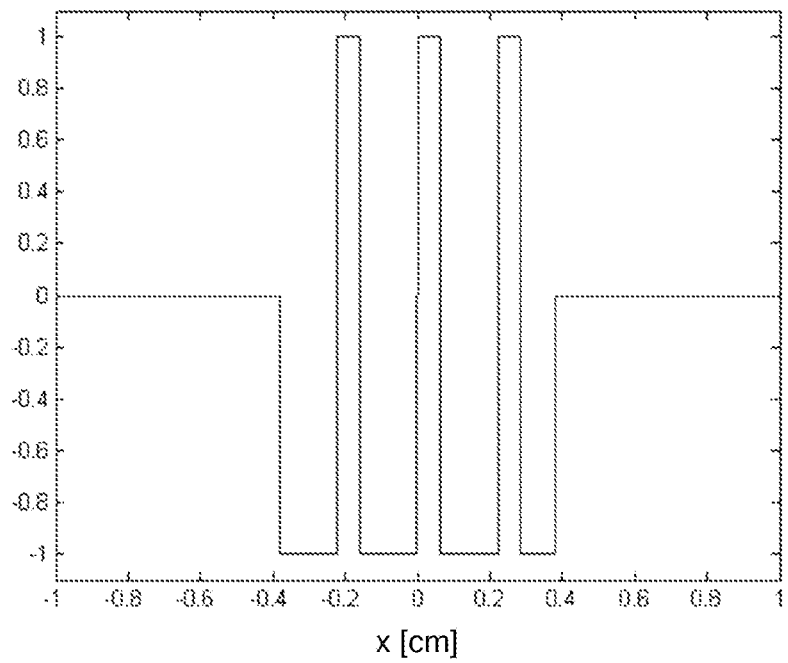
FIG. 9A is a graph depicting a discrete phase modulation function having a duty cycle near 0.3 according to one or more embodiments shown and described herein.
Figure 9B:
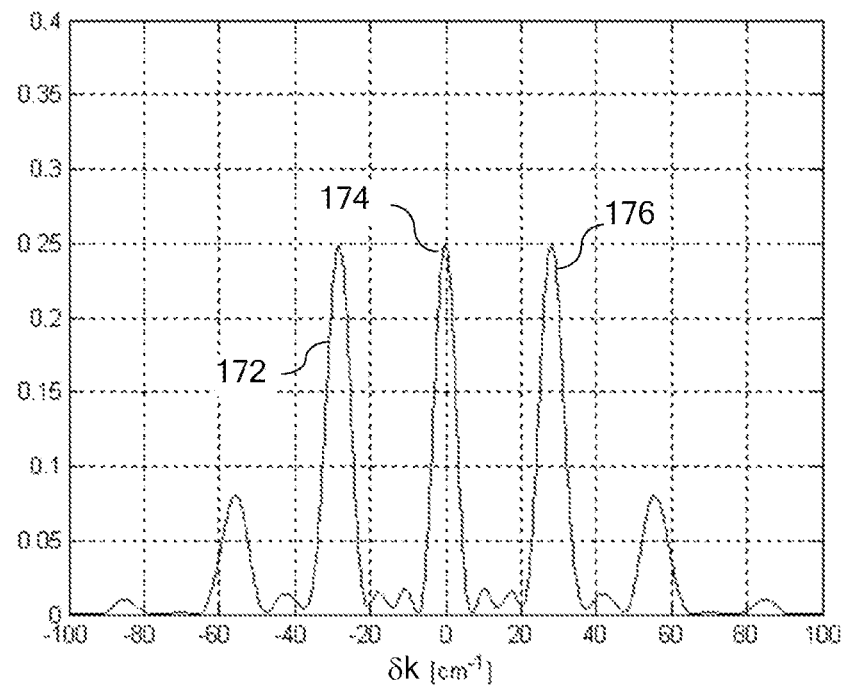
FIG. 9B is a graph depicting a spectral response in wave-vector space of a wavelength conversion device having a phase-modulated periodicity defined in part by the discrete phase modulation function illustrated in FIG. 9A according to one or more embodiments shown and described herein.

In another embodiment, the duty cycle of the discrete PMF 150 may be different from 50%, to limit the suppression of the central peak located at δk=0. With proper choice of duty cycle, three main spectral peaks may be obtained with approximately equal magnitude. FIG. 9A illustrates a discrete multiplicative PMF applied to a 7.6-mm device with the goal of generating three equal QPM peaks, and the spectral response is illustrated in FIG. 9B (comprising phase-matching peaks 172, 174 and 176). The duty cycle of the PMF is about 0.3. The PMF shows sign flips which are equivalent to phase jumps equal to π. The QPM peaks have a magnitude of 0.25 compared to that of a non-modulated QPM device of the same length. It is noted that the sign, rather than phase, is provided on the y-axis. The sign imposed by the PMF is compared to that of a truly periodic structure at the corresponding location.

Figure 10A:
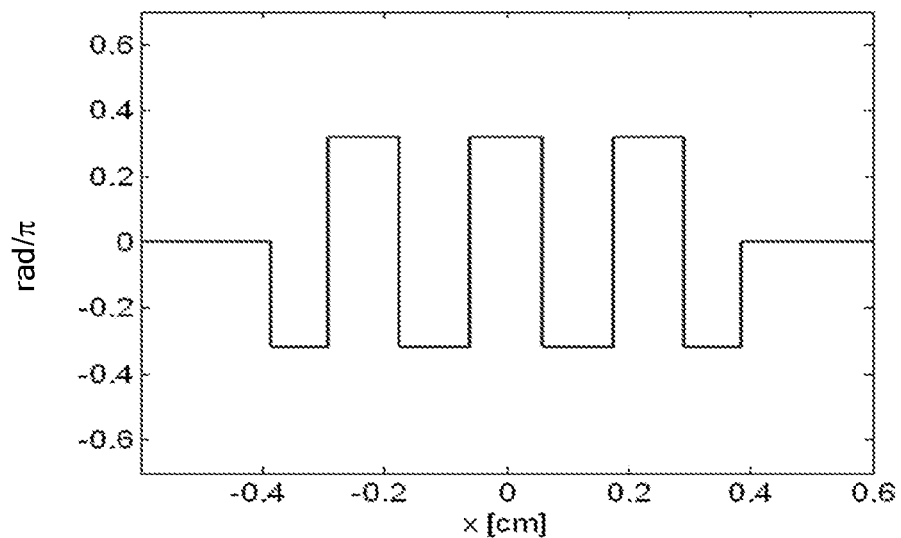
FIG. 10A is a graph depicting a rectangular symmetric phase modulating function according to one or more embodiments shown and described herein.
Figure 10B:
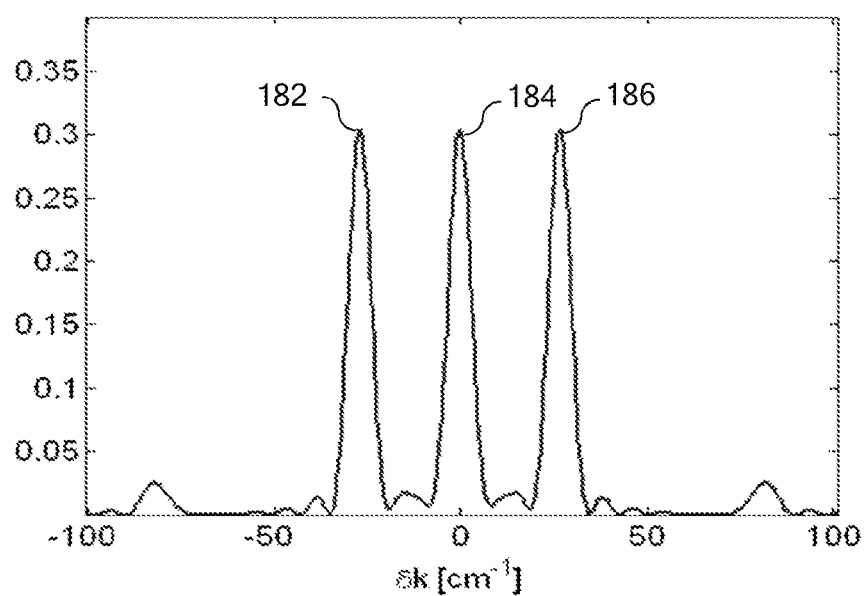
FIG. 10B is a graph depicting a spectral response in wave-vector space of a wavelength conversion device having a phase-modulated periodicity defined in part by the discrete phase modulation function illustrated in FIG. 10A according to one or more embodiments shown and described herein.

In another embodiment, the discrete PMF may control the ratios of the magnitudes of the multiple phase-matching peaks via the depth of discrete phase modulation, rather than only by the duty cycle. The PMF may consists of a rectangular waveform of imparted-phase distribution with amplitude $\Phi_0^{PM}$. The phase imparted on the phase-matching by the PMF is given by:

$$\Phi_{PM} = \Phi_0^{PM} \text{sign}\left(\cos\left(\frac{2\pi x}{\Lambda_{PM}}\right) + \varphi_0\right). \quad \text{Eq. (13)},$$

where $\phi_0$ is a parameter allowing for a constant phase shift of the PMF waveform with respect to the mid-point along the QPM structure, if desired. As an example, the PMF for the case L=3.3 $\Lambda_{PM}$ with peak ratio of 1:1:1 is illustrated in FIG. 10A, and the spectral response is illustrated in FIG. 10B (comprising phase-matching peaks 182, 184 and 186). Since the sign function takes on the values +1 when its argument is positive, −1 when its argument is negative, and 0 when its argument is 0, the phase defined by the PMF essentially jumps periodically between the values $\Phi^0{}_{PM}$ and $\Phi^0{}_{PM}$. The depth of phase modulation (DPM) ∈ equals twice the amplitude of phase modulation:

$$\in = 2\Phi^0{}_{PM}, \quad \text{Eq. (14)}.$$

Using a PMF defined by Eq. (13) with $\phi_0=0$ and $\Lambda_{PM}=0.2335$ cm on a wavelength conversion device with phase-matching length L=0.7706 cm, by using an amplitude $\Phi^0{}_{PM}$ of 0.316π, the three main peaks in the phase-modulated QPM spectral response have a ratio of 1:1:1. For spectral response with three near-equal peaks and with near-optimum PMF waveform truncation, an advantageous range for the phase amplitude $\Phi_0^{PM}$ is from about 0.29π to about 0.34π. Correspondingly, the advantageous range for the depth of modulation is from about 0.58π to about 0.68π. Similar to the case of a symmetric PMF enacting periodic sign-flips of the QPM structure described above for the symmetric discrete (rectangular) PMF defined by Eq. (13), optimum truncation occurs when the QPM length L is approximately equal to $(m+0.3)\Lambda_{PM}$, where m is again a positive integer. Near-optimum truncation occurs when the QPM length L is between approximately m+0.15 and m+0.45, and generally favorable truncation occurs when the length L is between about m−0.05 and about m+0.60. These ranges of near-optimum and generally favorable truncation apply also for the other types of periodic symmetric PMFs described below.

Figure 11A:
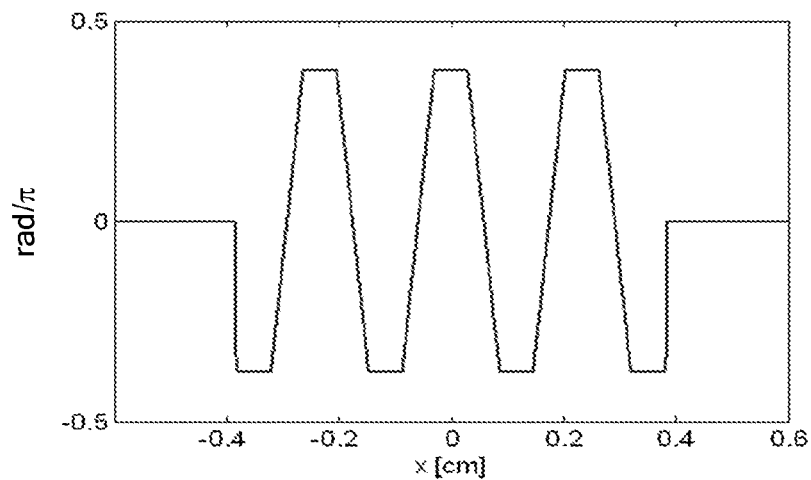
FIG. 11A is a graph depicting a trapezoidal phase modulation function according to one or more embodiments shown and described herein.
Figure 11B:
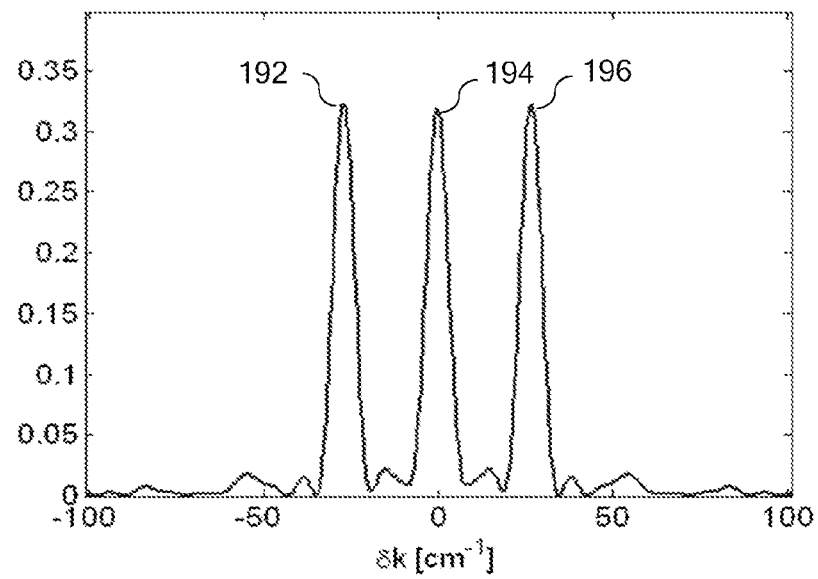
FIG. 11B is a graph depicting a spectral response in wave-vector space of a wavelength conversion device having a phase-modulated periodicity defined in part by the discrete phase modulation function illustrated in FIG. 11A according to one or more embodiments shown and described herein.

In another alternative embodiment, the PMF is a trapezoidal function of x. The function is periodic with period $\Lambda_{PM}$. FIGS. 11A and 11B illustrate an example of a trapezoidal PMF for the case of L=3.3 $\Lambda_{PM}$ with peak ratio of 1:1:1, and the corresponding spectral response. In each half-period, rather than taking on a single constant value, the imparted phase contains a ramp section and a plateau section. In the case of a symmetric trapezoidal PMF, the latter may be defined by the phase amplitude $\omega^0{}_{PM}$, the period $\Lambda_{PM}$, the phase shift $\phi_0$, and a plateau duty cycle (PDC). The PDC equals the length of a plateau section as a fraction of the half-period. The length $L_{ramp}$ of the ramp section is the rest of the half-period, and the ramp rate is $1/L_{ramp}$, multiplied by the amplitude $\Phi^0{}_{PM}$. Because of the additional free parameter (ramp), certain required phase-matching peak ratios can be obtained by different combinations of parameters, and thus different trapezoidal PMF waveforms. The trapezoidal PMF hence may provide a more flexible method to modulate the phase-matching to obtain optimum performance in terms of speckle reduction and conversion efficiency. As an example, a symmetric trapezoidal PMF ($\Lambda_{PM}$=0.2335 cm, $\phi_0$=0) with a total modulation depth of 0.754$\pi$ (PMF phase amplitude of 0.377$\pi$) and PDC of 0.51 leads to a QPM response with 3 equal peaks of magnitude 0.32 compared to that of a non-modulated QPM device (FIG. 11 B). Efficient QPM response with three approximately equal peaks is obtained for PMF phase amplitude in the range between about 0.5$\pi$ and about 0.60$\pi$ when the PDC is 0, and between about 0.29$\pi$ and about 0.34$\pi$ when the PDC is 1. Hence, the total range of optimum PMF phase amplitudes is between about 0.29$\pi$ and about 0.6$\pi$, with most favorable case having a PMF phase amplitude about 0.377$\pi$ (total modulation depth of about 0.754$\pi$) and PDC of about 0.51. The corresponding range of depths of modulation is from about 0.58$\pi$ to about 1.2$\pi$.

The linear ramp of the imparted phase represents a constantly increasing or decreasing phase shift along the propagation direction. It can also be seen from a different point of view as a change in the local period of the QPM structure, in the case of quasi-phase matching. Thus, the symmetric continuous trapezoidal phase modulation function can be seen to represent a structure containing three different QPM periods. The period of the unperturbed design is observed in the regions along the device length where the PMF is represented by a plateau of the imparted phase. In the regions where the PMF is represented by ramps, the period is fixed to one of two values, one smaller, and one larger than the carrier periodicity, depending on whether the ramp is positive or negative.

Figure 12A:
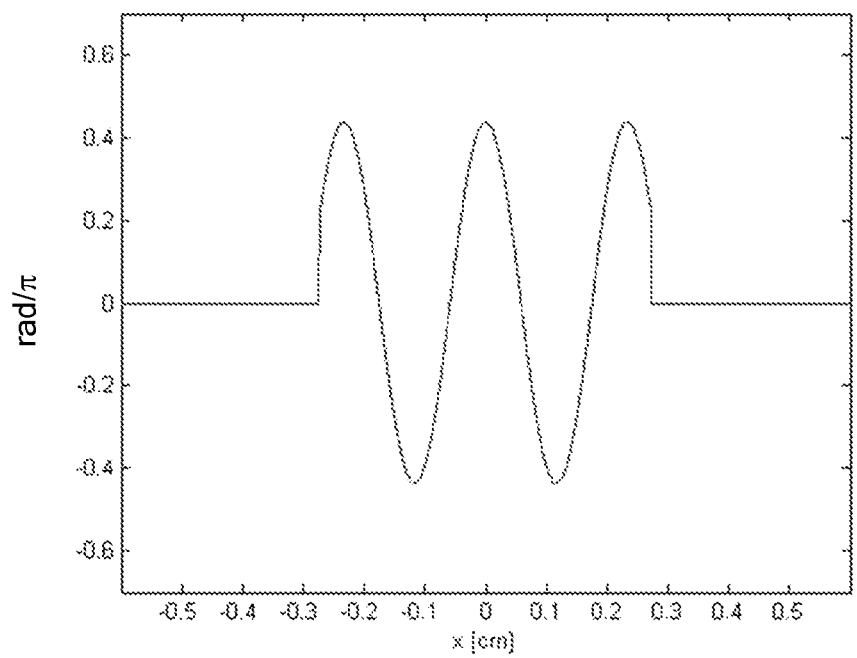
FIG. 12A is a graph depicting a continuous sinusoidal phase-modulating function according to one or more embodiments shown and described herein.
Figure 12B:
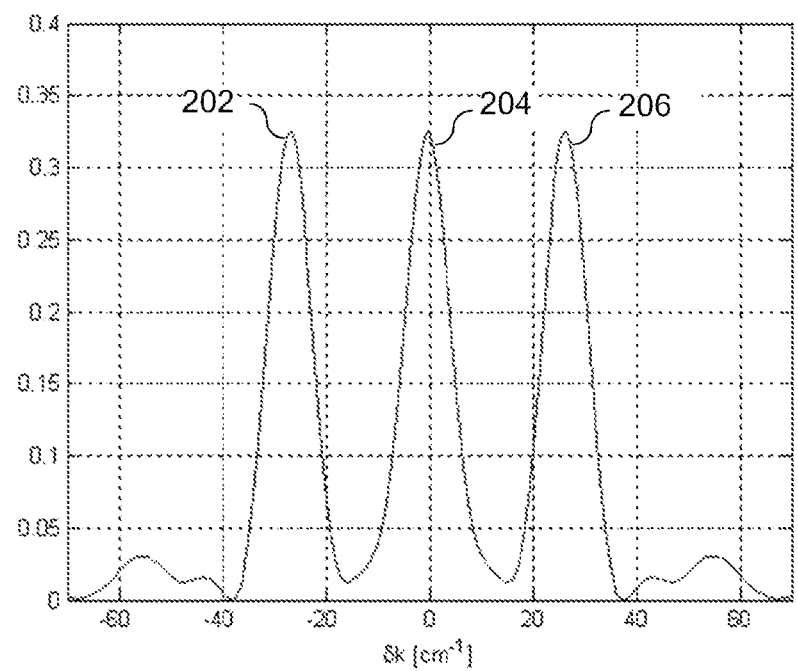
FIG. 12B is a graph depicting a spectral response in wave-vector space of a wavelength conversion device having a phase-modulated periodicity defined in part by the discrete phase modulation function illustrated in FIG. 12A according to one or more embodiments shown and described herein.

FIGS. 12A and 12B illustrate another embodiment of phase modulation that may be utilized to produce at least two frequency-converted spectral peaks of the wavelength conversion device. The PMF illustrated in FIG. 12 is a sinusoidal function that, when applied to the carrier periodicity $\Lambda$, provides for a plurality of domains having a phase-modulated periodicity. Rather than discretely modulating the phase of the plurality of domains as described above with respect to FIGS. 7-10B, the sinusoidal function has the effect of continuously shifting the position of the ferroelectric domains with respect to normal periodic positions defined by the phase matching period $\Lambda$. As described above with respect to the discrete PMFs, the phase-modulated periodicity, when applied to the nonlinear optical material in the form of quasi-periodic poling, has the effect of splitting a single quasi-phase matching peak centered at $\delta k$=0 into multiple quasi-phase matching peaks, and producing side bands equally spaced adjacent to the center quasi-phase matching peak. The sinusoidal PMF has a very large period compared with the phase matching period $\Lambda$ and therefore a very small k-vector. Therefore, the sinusoidal function introduces a very small perturbation on the relative positions of the poling domains.

Referring specifically to FIG. 12A, one embodiment of a PMF and resulting plurality of poling domains having a phase-modulated periodicity is illustrated. FIG. 12A illustrates a sinusoidal function that, when applied to the phase matching period $\Lambda$, continuously shifts the positions of the poling domains by $\Delta x(x_l)$, which may be expressed by:

$$\Delta x(x_l) = \frac{\Lambda \Phi_0^{PM}}{2\pi}\cos(k_x x_l + \phi_0) = \frac{\varepsilon \Lambda}{\pi}\cos(k_x x_l + \phi_0), \quad \text{(Eq. 15)},$$

where $\varepsilon$ is the depth of phase modulation equal to twice the phase modulation amplitude $\Phi_0^{PM}$, and $k_x$ is the k-vector of the sinusoidal PMF. The depth of modulation $\varepsilon$ affects the relative magnitude of the resulting quasi-phase matching peaks (202, 204, 206, FIG. 12B). For example, the design of FIG. 12A has a total depth of phase modulation equal to 0.882$\pi$.

As discussed above, in the case of a PMF that is symmetric with respect to the middle of the QPM length, optimum truncation of the phase-modulation provided when the relationship between the length of the phase-modulated QPM structure and the period of the sinusoidal function is:

$$L=(m+0.3)*\Lambda_s, \quad \text{Eq. (16)},$$

where $\Lambda_s$ is the period of the sinusoidal function and m=1, 2, 3 and so on. The range of advantageous values for the ratio $L/\Lambda_s$ is between about m+0.15 and about m+0.45, with an optimum centered around m+0.3. Generally favorable truncation occurs when $L/\Lambda_s$ is between about m−0.05 and about m+0.6. When the length of the wavelength conversion device is chosen among these ranges and the sinusoidal function is applied symmetrically with respect to the center of the wavelength conversion device, most of the nonlinear spectral response is preserved among the three desired quasi-phase matching peaks (e.g., quasi-phase matching peaks 202, 204, 206) and less goes to the unused quasi-phase matching peaks outside of the central wavelength region of interest.

When the length of the wavelength conversion device is chosen in this manner, the truncation on the two edges of the wavelength conversion device occurs right after a peak or a trough of the sinusoidal function and not on or right after a steep slope. The peaks and troughs of the cosine of the phase are regions where the period of poling has a value near the center of the range of periods covered by the phase-modulated QPM-grating. The regions where the phase changes fast on sloped parts of the sinusoidal function are regions where the local period is substantially shorter or substantially longer than the average period. Such periods phase match second harmonic generation for wavelengths that are away from the central wavelength, thereby spreading the efficiency outside of the central region of interest. In some embodiments (e.g., 3 wavelengths lasers), it was also determined that for sinusoidal phase modulation as described by equation 15, the optimum total depth of modulation c for spectral response with three nearly equal QPM peaks is between about 0.86$\pi$ and about 0.90$\pi$ (phase amplitude $\Phi_0^{PM}$ between about 0.43$\pi$ and 0.45$\pi$). In addition, the spectral response has three dominant approximately equal QPM peaks when the total depth of phase modulation c is between about 0.8$\pi$ and about 0.98$\pi$ (phase amplitude $\Phi_0^{PM}$ between about 0.4$\pi$ and 0.49$\pi$).

Figure 13:
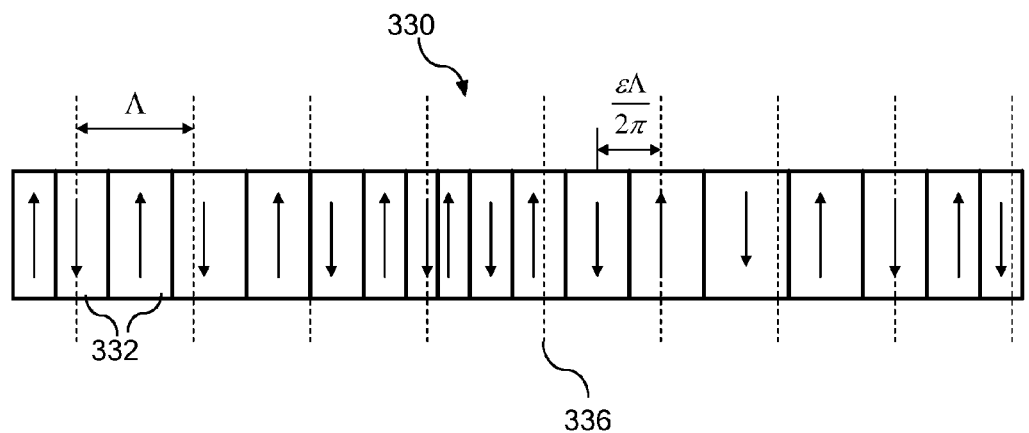
FIG. 13 is a schematic diagram depicting a wavelength conversion device having a phase-modulated periodicity defined in part by a phase modulating function according to one or more embodiments shown and described herein.

FIG. 13 schematically illustrates a portion of a wavelength conversion device 330. The wavelength conversion device 330 comprises a plurality of poling domains 332 that alternate in crystallographic orientation as indicated by the up ↑ and down ↓ arrows. The respective positions of the poling domains 332 are longitudinally shifted relative to normal periodic positions defined by the carrier periodicity (depicted by dashed vertical lines 336). The longitudinal shift illustrated in FIG. 13 is continuous in accordance with the sinusoidal PMF. However, it should be understood that the longitudinal shift may be in accordance with PMF other than those that are sinusoidal.

Figure 14A:
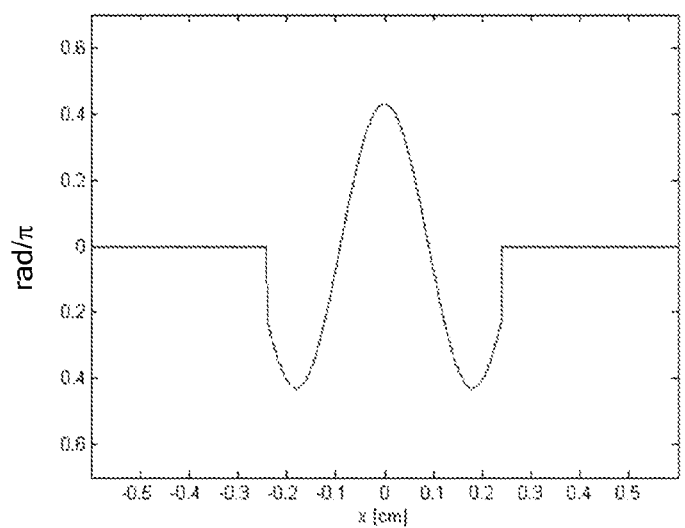
FIG. 14A is a graph depicting a continuous sinusoidal phase-modulating function according to one or more embodiments shown and described herein.
Figure 14B:
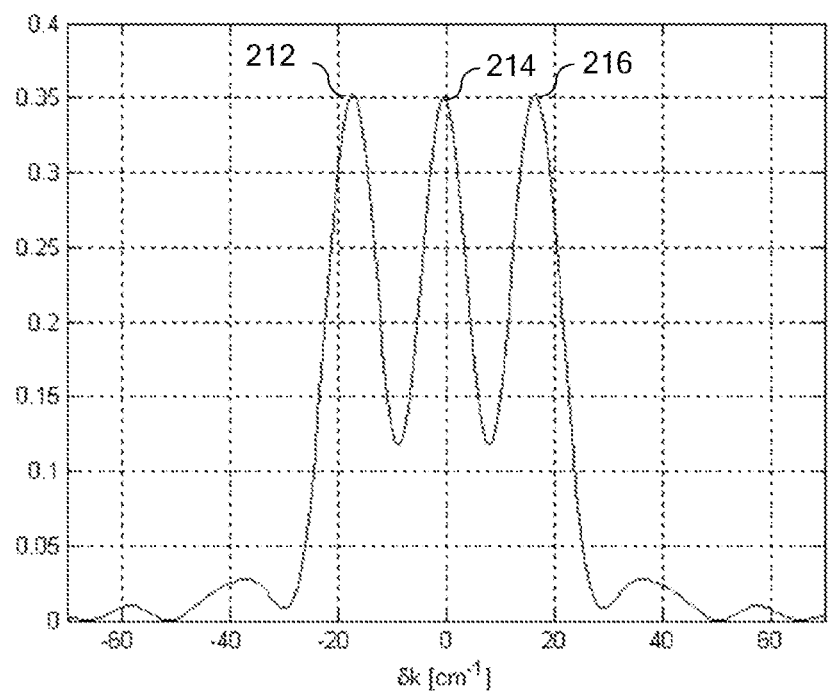
FIG. 14B is a graph depicting a spectral response in wave-vector space of a wavelength conversion device having a phase-modulated periodicity defined in part by the sinusoidal function illustrated in FIG. 14A according to one or more embodiments shown and described herein.
Figure 14C:
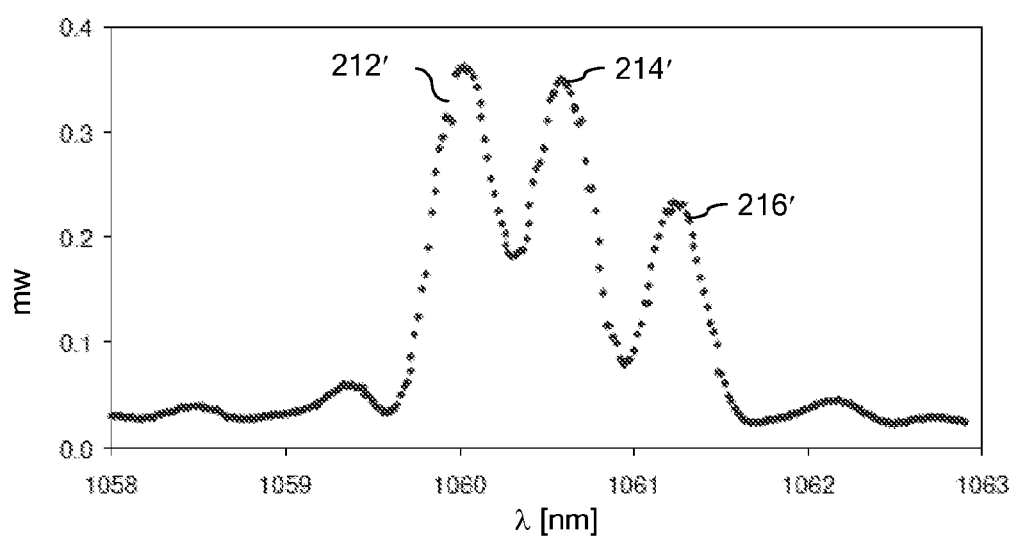
FIG. 14C is a graph depicting a measured wavelength spectral response of a wavelength conversion device designed to have a phase-modulated periodicity defined in part by the sinusoidal function illustrated in FIG. 14A according to one or more embodiments shown and described herein.

FIG. 14A illustrates another sinusoidal PMF with period chosen to allow maximum utilization of the normalized conversion efficiency among 3 main QPM peaks. This may limit the separation of the QPM peaks as the optimum separation is uniquely associated with the device length. On the other hand, if the separation is adequate for generating three independent speckle patterns, and the device length is adequate for efficient frequency conversion, this design fully utilizes the efficiency provided by the available interaction length. As illustrated in FIG. 14B, the response ratio of the three quasi-phase matching peaks 212, 214, 216 is approximately 1:1:1. FIG. 14B illustrates the quasi-phase matching peaks 212, 214, 216 in δk space while FIG. 14C illustrates the same three quasi-phase matching peaks 212', 214', 216' in wavelength space for a fabricated 4.8-mm long quasi-periodically-poled MgO-doped lithium niobate waveguide. The experimental ratio of the quasi-phase matching peak magnitudes may vary somewhat compared with the theoretical ratio due to imperfect device fabrication. Such imperfections may include, but are not limited to, low-to-moderate poling fidelity and some waveguide non-uniformity along the length in the case of wavelength conversion devices based on waveguides. Small variations of the quasi-phase matching peak ratio will typically have a small effect on the speckle reduction properties.

Figure 15:
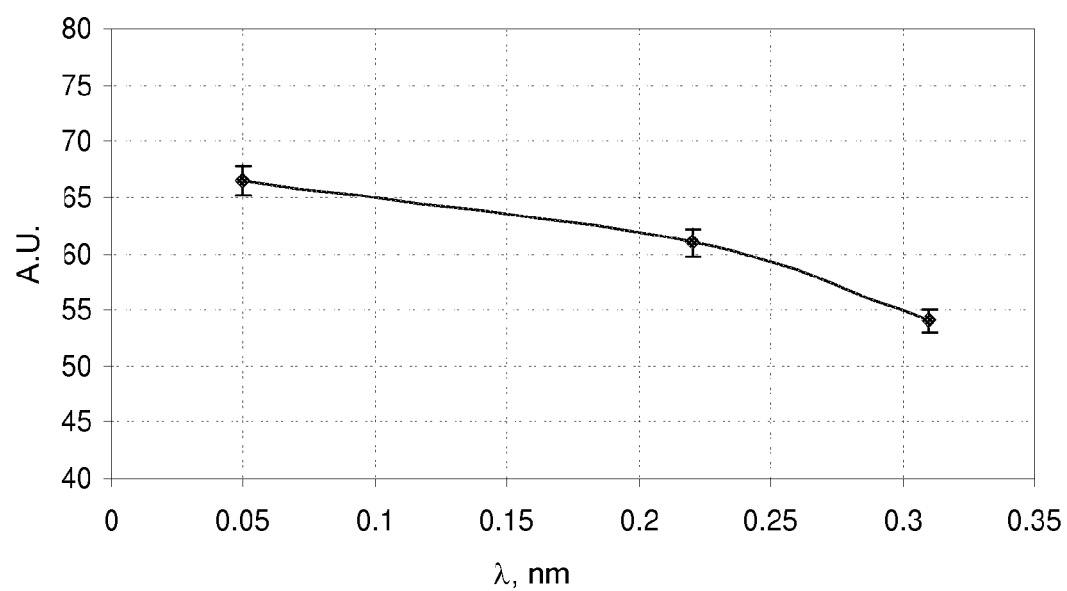
FIG. 15 is a graph depicting measured speckle contrast versus spectral width in the green spectral range for copy-paper projection-screen material.

As noted above, the expected perceived speckle contrast reduction (by time averaging in the human eye) is $\sqrt{2}$ if the laser alternates between two narrow spectral lines (i.e., fundamental spectral peaks) with sufficient separation and $\sqrt{3}$ if it alternates between three lines for consecutive projected image frames. Speckle reduction may be further increased from those values if each of the lines emitted by the laser is spectrally broadened. FIG. 15 illustrates measured speckle contrast versus spectral width for copy paper as a projection screen material. As shown in FIG. 15, even for a spectral width of only 0.3 nm additional 20% reduction of speckle contrast is measured when white copy paper serves as the projection screen material. Further, a spectral width of 0.1 nm for the frequency converted spectral peaks (full width at half maximum in the green spectral range) may reduce speckle contrast by about 10% (which is about 0.2 nm in the infrared spectral range). Therefore, some embodiments may utilize a spectral width of greater than 0.1 nm in the frequency-converted range to provide for some additional speckle contrast reduction. Since, as also noted above, it is advantageous for the practice of the embodiments described herein to operate the pump laser in pulsed mode, to compensate for conversion efficiency decrease introduced by aperiodic poling, some spectral broadening of each emitted spectral peak may be relatively easy to achieve. Various techniques for pulsing semiconductor lasers (gain-switching, Q-switching, and hybrid gain/Q-switching) may be utilized.

In pulsed operation, the spectral shape and width of the diode optical output closely follows the shape and width of the spectral response of its cavity reflectors (the DBR mirror in case of DBR lasers). Therefore, to broaden the emitted spectral peak, the spectral bandwidth of the DBR mirror may be increased, e.g., by chirping the period of the built-in diffraction grating and/or increasing the coupling parameter (grating "strength"). When the DBR laser is switched (fast tuned) to a different central wavelength (by changing temperature and/or bias current of the DBR section), the spectral width of the emitted spectral peak will remain approximately the same. Therefore, the speckle contrast reduction due to line broadening (e.g., as predicted by the graph of FIG. 15) will be added to the reduction produced by time averaging of the wavelength hopping. If the spectral peak or line is broadened to about 0.4 nm and the central wavelength is switched between three positions separated by about 0.4 nm or more, then the expected perceived speckle contrast reduction for the white copy paper projector screen material may be as much as $\sqrt{2}\sqrt{3}=\sqrt{6}$.

An additional advantage of broadening the frequency-converted spectral peak(s) of the green laser optical system is that it makes the laser optical system compatible with a passive polarization scrambling technique. Passive polarization split-and-delay units convert small variations of the laser output wavelength into large variations of the polarization state. When such a device is inserted in the optical path of the beam emitted by the laser, an additional $\sqrt{2}$ speckle contrast reduction may result. If the fundamental spectral peaks(s) are broadened to 0.4 nm, the size of the split-and-delay unit could be very small, on the order of 1 mm Switching between three central wavelength positions, the total reduction of the speckle contrast will be up to $\sqrt{2}*\sqrt{2}*\sqrt{3}=\sqrt{12}$.

Regarding spectral line broadening, the high-power DBR lasers typically have a relatively long cavity (2-4 mm) and non-zero reflection at the front facet, which means that their round-trip cavity loss spectrum is a superposition of a DBR mirror reflection and periodic Fabry-Perot peaks. When the DBR mirror reflection bandwidth is increased, several Fabry-Perot peaks will fit inside it, resulting in the laser emitting not a one line, but several closely spaced lines (Fabry-Perot modes). This will change the conversion efficiency for second harmonic generation and should be taken into consideration when designing wavelength-switched lasers according to the present disclosure. Generally speaking, if each fundamental spectral peak contains N modes, an increase in efficiency close to (2-1/N) will be realized compared to the single-mode fundamental peak case, slightly less because the N modes will not all have the same intensity (power).

While the broader the spectral line the better the speckle reduction, for preserving conversion efficiency the overall spectral bandwidth of each of the pump laser spectral peaks should not be significantly larger than the QPM bandwidth of each of the quasi-phase matching peaks. For example, if the pump laser fundamental spectral peak has a spectral width of 0.3 nm in wavelength space, then a quasi-phase matching FWHM bandwidth of any of the two or three quasi-phase matching peaks that is significantly smaller than 0.3 nm may substantially decrease the conversion efficiency provided by that QPM peak. Such a decrease in conversion efficiency may also depend on whether the spectral width of the fundamental spectral peaks is dominated by frequency chirp (variation of the central optical frequency of the pulse over the duration of the pulse) or by the simultaneous generation of many longitudinal modes. If the spectral width of the fundamental spectral peaks is dominated by frequency chirp, the reduction in efficiency due to QPM spectral filtering may be more significant. The efficiency reduction due to limited QPM-peak bandwidth may impose limits on the length of the wavelength conversion device or on the complexity of the PMF used to produce the multiple quasi-phase matching peaks.

Figure 16A:
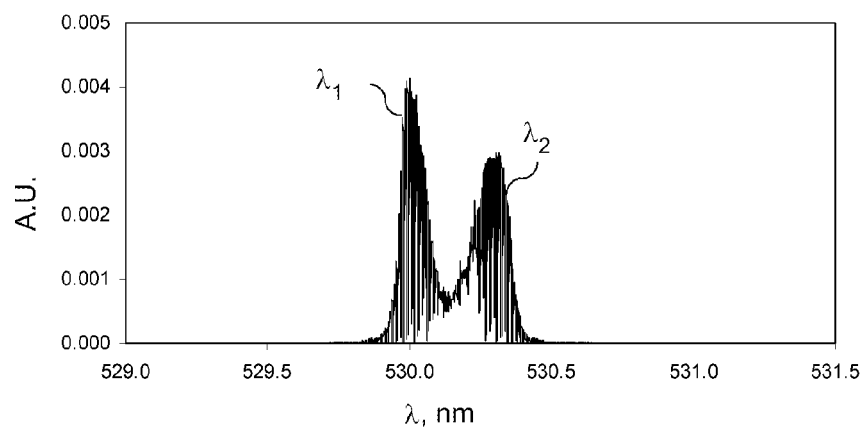
FIGS. 16A-16C are graphs depicting output optical spectra of an optical system having a pump beam that switches between three wavelengths according to one or more embodiments shown and described herein.
Figure 16B:
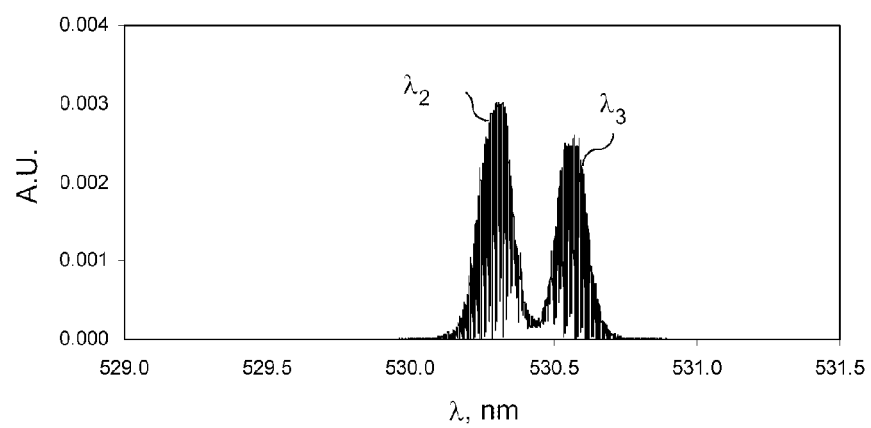
Figure 16C:
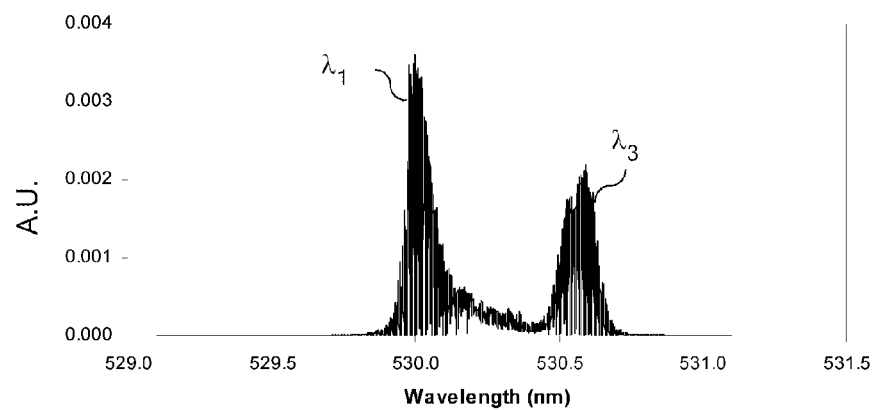

As an example and not a limitation, a three-section 1060 nm DBR laser was used to pump a SHG wavelength conversion device 130 which was poled to QPM at three pump wavelengths: 1059.9 nm, 1060.5 nm, and 1061.1 nm (FIG. 14C). FIG. 1 shows the experimental setup. The fast wavelength switching of the pump laser was realized by applying a 65 Hz electrical square wave to the DBR heater of the DBR section electrode 102 to thermally change Bragg-resonance wavelength of the DBR section 112. The pump laser was gain-switched by applying a sinusoidal signal superimposed on a DC current to the gain section. By properly setting the heat sink temperature of the pump laser 110 and the amplitude of the electrical square wave signal, the output wavelength of the pump laser was fast switched between two of the three fundamental spectral peak wavelengths. Thus, the output from the wavelength conversion device 130 can be fast switched between any two of the three frequency-converted spectral peaks having approximate green wavelengths $\lambda_1$=530 nm, $\lambda_2$=530.3 nm and $\lambda_3$=530.6 nm FIGS. 16A-16C depict the output spectra (average of 20 measurements) of the wavelength-switched green laser for three different operation modes. The switching time between $\lambda_1$ and $\lambda_3$ is about 1.5 ms (FIG. 16C), and the switching time between $\lambda_1$ and $\lambda_2$ (FIG. 16A) or $\lambda_2$ and $\lambda_3$ (FIG. 16B) is about 1.0 ms. With an appropriate electrical waveform with plateaus at three different levels applied to the DBR heater, optical output at all three different green wavelengths may be produced within the integration time of the eye, allowing for $\sqrt{3}$ speckle-contrast reduction.

Figure 17:
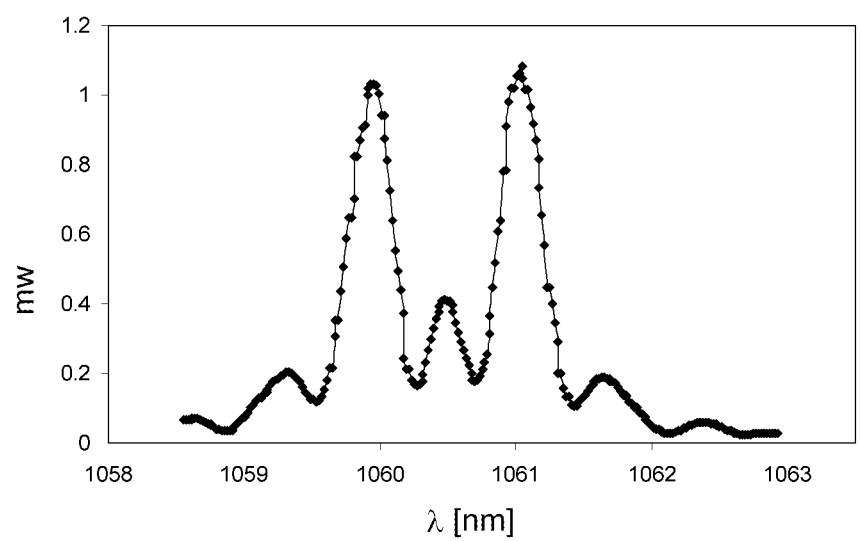
FIG. 17 is a graph depicting a measured tuning curve of a quasi-phase matching wavelength conversion device according to one or more embodiments described and illustrated herein.
Figure 18A:
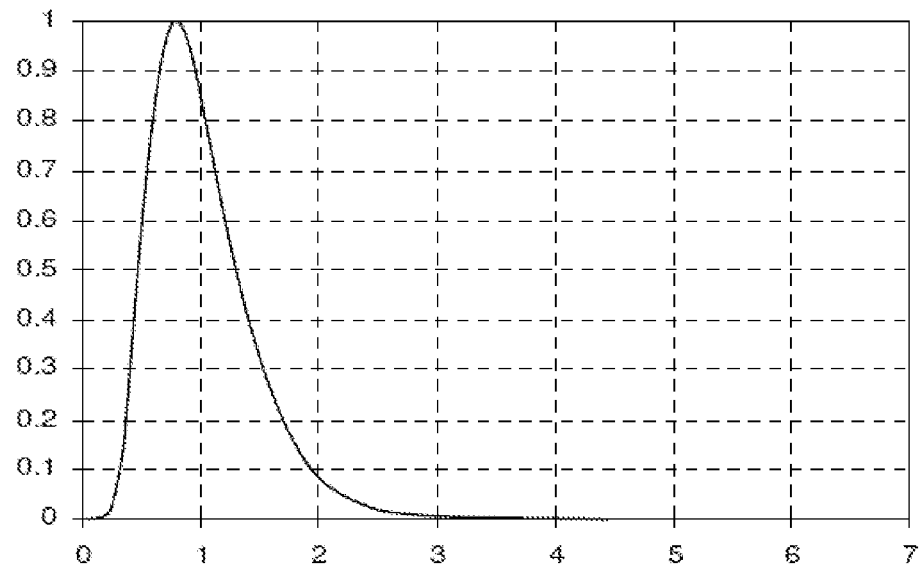
FIG. 18A is a graph depicting a measured image histogram of an optical system pumped by a DBR laser with a switched-wavelength output according to one or more embodiments described and illustrated herein.
Figure 18B:
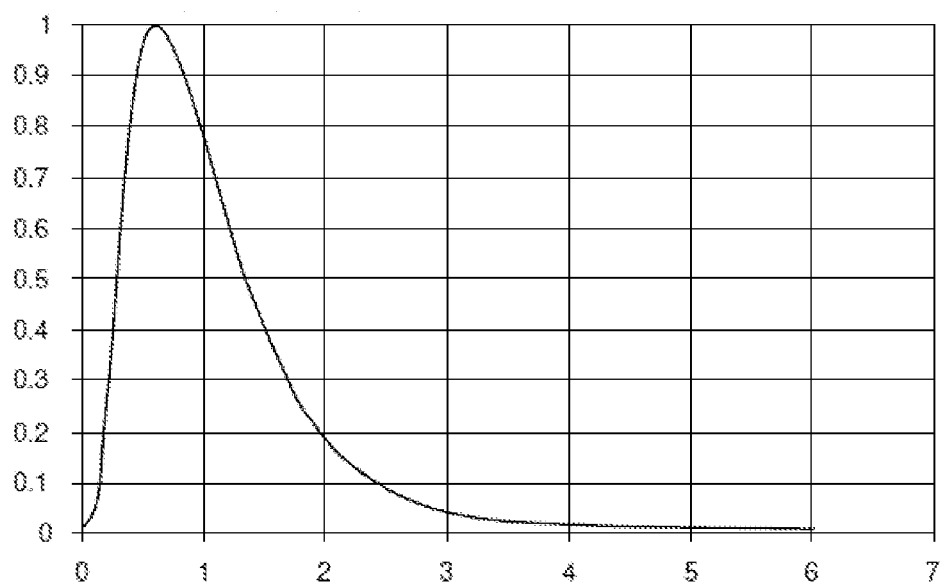
FIG. 18B is a graph depicting measure image histogram of an optical system pumped by a DBR laser operated in CW mode.

As another example and not a limitation, a three-section DBR laser was used to pump a SHG waveguide which was poled to QPM at room temperature mainly at two pump wavelengths: 1059.7 nm and 1060.8 nm. The tuning curve of the SHG waveguide is shown in FIG. 17. The exemplary SHG waveguide QPM design is based on sinusoidal phase modulation with large depth of modulation to produce two main side peaks and reduced central peak. Side peaks with normalized efficiency greater than about ⅓ of the efficiency of a truly periodically poled device of the same length are produced when the depth of sinusoidal phase modulation is between about $0.92\pi$ and about $1.4\pi$, with optimum range between and about $1.04\pi1.3\pi$. The wavelength of the pump laser was alternated between the two phase-matched wavelengths by applying a 65 Hz electrical square wave to the DBR heater. The pump laser was gain-switched by applying a sinusoidal signal superimposed on a DC current to the gain section. FIG. 2 illustrates the output spectrum (average of 22 measurements) of the green laser with laser wavelength alternating between $\lambda_1=529.85$ nm and $\lambda_2=530.40$ nm. To measure the speckle contrast, the non-collimated green output beam was projected on regular printer white paper which was taped on a non glossy back board. FIG. 18A illustrates the measured image brightness histogram of the output of the wavelength-alternated green laser. For comparison, the measured histogram of a CW single-wavelength green output is shown in FIG. 18B. The speckle contrast was reduced from 63.2% to 43.1% by alternating the laser wavelength, which corresponds to a reduction of slightly more than $\sqrt{2}$.

Figure 19:
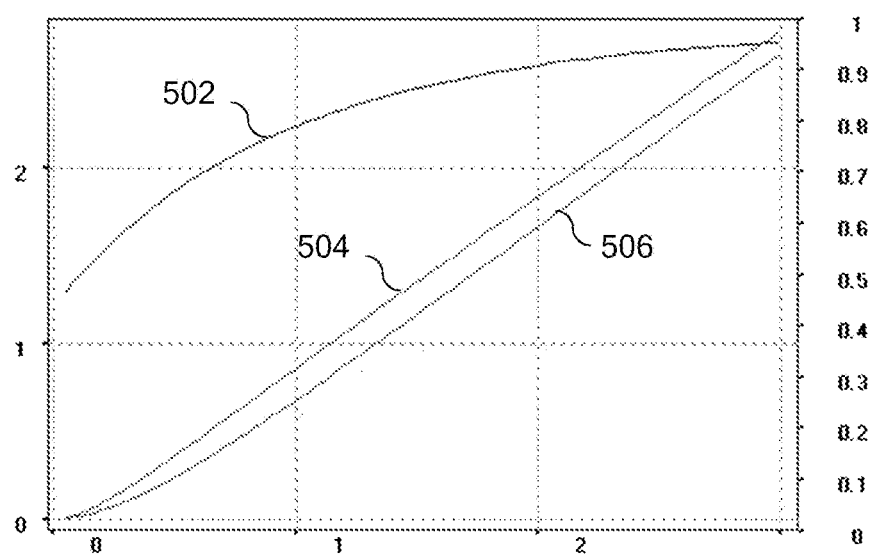
FIG. 19 is a graph depicting second harmonic generation conversion efficiency at high peak power of uniform period poling structure and a quasi-phasematching structure according to one or more embodiments described and illustrated herein.

It is noted that due to the saturation of conversion efficiency at high peak power, using phase-modulated QPM devices in the pulsed regime may come at virtually no cost in terms of conversion efficiency in comparison with the same pulsed regime with uniform QPM structure of the same length. FIG. 19 shows the results of a simulation of second harmonic output power as a function of input power when the peak power is high which normally leads to saturation of SHG conversion efficiency when the QPM structure is strictly periodic. The x-axis is infrared input power, while the left y-axis is green output power in watts and the right y-axis is normalized efficiency. Plot 504 is the efficiency of a QPM structure with constant carrier periodicity and periodic sign flips (phase shifts of $\pi$) while plot 506 is a the efficiency of a uniformly poled crystal. Plot 502 shows that at a peak power of 2 watts the conversion efficiency with the sign-modulated QPM structure is over 90% of that with the uniformly poled crystal. The lower normalized conversion efficiency of the aperiodic QPM structure leads to offset of the saturation of conversion efficiency to higher pump-power levels. This substantially reduces the gap in conversion efficiency between the strictly periodic QPM device and the phase-modulated QPM device at high peak optical power. The saturation of SHG conversion efficiency at high optical power leads to a reduction of the area of the normalized-efficiency tuning curve showing the conversion efficiency in %/W as a function of wavelength. Spreading the phase-matching over a larger wavelength range by phase-modulation of the QPM structure allows to recover some or most of that loss of efficiency-bandwidth area and utilize it for speckle reduction, It is to be understood that the preceding detailed description is intended to provide an overview or framework for understanding the nature and character of the subject matter as it is claimed. It will be apparent to those skilled in the art that various modifications and variations can be made to the embodiments described herein without departing from the spirit and scope of the invention. Thus, it is intended that the present invention cover the modifications and variations of this invention provided they come within the scope of the appended claims and their equivalents.

It is noted that terms like "preferably," and "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Further, it is noted that reference to a value, parameter, or variable being a "function of" another value, parameter, or variable should not be taken to mean that the value, parameter, or variable is a function of one and only one value, parameter, or variable.

For the purposes of describing and defining the present invention it is noted that the terms "substantially," "approximately" and "about" are utilized herein to represent the inherent degree of uncertainty that may be attributed to any quantitative comparison, value, measurement, or other representation. The term "substantially" is also utilized herein to represent the degree by which a quantitative representation. e.g., "substantially above zero," varies from a stated reference, e.g., "zero," and should be interpreted to require that the quantitative representation varies from the stated reference by a readily discernable amount.

What is claimed is:

1. An optical system comprising a laser and a wavelength conversion device, wherein:
   the laser emits a pump beam that switches between at least two fundamental spectral peaks at different wavelengths at a wavelength cycling period that is shorter than a response time of the human eye; and
   the wavelength conversion device comprises a non-linear optical medium configured to phase match the frequency doubling of the at least two switched fundamental spectral peaks such that an output beam that switches between at least two frequency-converted spectral peaks at different converted-wavelengths is emitted from an output facet of the wavelength conversion device when the pump beam is incident on an input facet of the wavelength conversion device.

2. The optical system of claim 1 wherein the optical system is programmed to:
   generate at least a portion of a laser image on a projection surface by operating the laser for optical emission of encoded image data, the laser image comprising a plurality of successive image frames temporally separated by an inter-frame time; and
   control the laser such that the pump beam switches between the at least two fundamental spectral peaks during the inter-frame time.

3. The optical system of claim 2 further comprising an optical scanning device, wherein the optical system is programmed to generate the scanned image on the projection surface by controlling the optical scanning device to scan the output beam across a plurality of image pixels forming the successive image frames.

4. The optical system of claim 3 wherein the pump beam transitions between the at least two fundamental spectral peaks at a transition time that is less than or equal to 4 ms.

5. The optical system of claim 1 wherein:
the plurality of successive frames comprises at least two color-specific image frames that are successively generated;
one of the at least two color-specific image frames comprises a frequency-converted color image frame; and
the inter-frame time is defined by a time between successive frequency-converted color image frames.

6. The optical system of claim 1 wherein the laser is operated such that the at least two fundamental spectral peaks have approximately equal power.

7. The optical system of claim 1 wherein the at least two frequency-converted spectral peaks are separated by more than about 0.2 nm in wavelength.

8. The optical system of claim 1 wherein:
the laser comprises a wavelength selective section thermally coupled to a heater device; and
the pump beam switches between the at least two fundamental spectral peaks by the change of temperature produced by the heating device.

9. The optical system of claim 1 wherein:
the laser comprises a wavelength selective section; and
the pump beam switches between the at least two fundamental spectral peaks by the injection of a modulated electrical current into the wavelength selective section.

10. The optical system of claim 1 wherein:
the wavelength conversion device is characterized by a first phase matching peak and a second phase matching peak;
the at least two fundamental spectral peaks comprise a first fundamental spectral peak and a second fundamental spectral peak;
the at least two switched frequency-converted spectral peaks comprise a first frequency-converted spectral peak and a second frequency-converted spectral peak; and
a response ratio of the first phase matching peak and the second phase matching peak is such that the first and second frequency-converted spectral peaks of the output beam have approximately equal average power when the pump beam is incident on the input facet of the wavelength conversion device.

11. The optical system of claim 1 wherein:
the wavelength conversion device is characterized by a first phase matching peak, a second phase matching peak, and a third phase matching peak;
the at least two fundamental spectral peaks comprise a first fundamental spectral peak, a second fundamental spectral peak, and a third fundamental spectral peak;
the at least two switched frequency-converted spectral peaks comprise a first frequency-converted spectral peak, a second frequency-converted spectral peak, and a third frequency-converted spectral peak; and
a response ratio of the first phase matching peak, the second phase matching peak, and the third phase matching peak is such that the first, second and third frequency-converted spectral peaks of the output beam have approximately equal average power when the pump beam is incident on the input facet of the wavelength conversion device.

12. The optical system of claim 1 wherein:
the non-linear optical medium is quasi-periodically poled and comprises a plurality of poling domains positioned along a longitudinal optical axis of the wavelength conversion device in accordance with a phase-modulated periodicity that is characterized by a phase modulation function superimposed on a carrier periodicity such that respective positions of at least some of the poling domains are longitudinally shifted relative to normal periodic positions defined by the carrier periodicity;
the phase-modulated periodicity of the plurality of poling domains is such that the wavelength conversion device is characterized by at least two phase matching peaks that produce the frequency-converted spectral peaks; and
at least two of the frequency-converted spectral peaks have approximately equal power when the pump beam is incident on the input facet of the wavelength conversion device.

13. The optical system of claim 12 wherein the phase modulation function is a rectangular wave phase modulation function with a total modulation depth of $\pi$ such that the plurality of domains are phase-modulated by a periodic sign-reversal of selected domains.

14. The optical system of claim 13 wherein:
the wavelength conversion device is characterized by a first phase matching peak and a second phase matching peak; and
the periodic sign-reversal has a duty cycle of about 0.5.

15. The optical system of claim 12 wherein the phase modulation function is a rectangular wave phase modulation function with a total modulation depth other than $\pi$.

16. The optical system of claim 15 wherein the total modulation depth of the rectangular wave phase modulation function is between $0.58\pi$ to about $0.68\pi$.

17. The optical system of claim 12 wherein the phase modulation function is a periodic trapezoidal function.

18. The optical system of claim 17 wherein the periodic trapezoidal function is characterized by a total modulation depth ranging from about $0.58\pi$ to about $1.2\pi$.

19. The optical system of claim 17 wherein the periodic trapezoidal function is characterized by a total modulation depth of about $0.754\pi$ and a plateau duty cycle of about 0.51.

20. The optical system of claim 12 wherein the phase modulation function is a sinusoidal function such that the plurality of domains is continuously phase-modulated.

21. The optical system of claim 20 wherein the sinusoidal function is characterized by a total modulation depth ranging from about $0.80\pi$ to about $1.4\pi$.

22. The optical system as claimed in claim 12 wherein the length of the wavelength conversion device is within a range of about $(m-0.05)*\Lambda_S$ to about $(m+0.6)*\Lambda_S$ for a symmetric phase modulation function or within a range of about $(m-0.55)*\Lambda_S$ to $(m+0.05)*\Lambda_S$ for an anti-symmetric phase modulation function, where $\Lambda_S$ is the period of the phase modulation function and m is a non-negative integer.

23. The optical system of claim 1 wherein the spectral bandwidth of the at least two frequency-converted spectral peaks is greater than or equal to 0.1 nm.

24. An optical system comprising a laser and a wavelength conversion device, wherein:
the laser emits a pump beam that switches between at least two fundamental spectral peaks separated by at least 0.4 nm at a wavelength cycling period;
the wavelength conversion device comprises a non-linear optical medium that is quasi-periodically poled with a plurality of poling domains positioned along a longitudinal optical axis of the wavelength conversion device in accordance with a phase-modulated periodicity that is characterized by a phase modulation function superimposed on a carrier periodicity such that respective positions of at least some of the poling domains are longitudinally shifted relative to normal periodic positions defined by the carrier periodicity; and the phase-modulated periodicity of the plurality of poling domains is such that the wavelength conversion device is characterized by at least two phase matching peaks that phase match the frequency doubling of the at least two switched fundamental spectral peaks such that an output beam that switches between at least two frequency-converted spectral peaks separated by at least 0.2 nm in wavelength is emitted from an output facet of the wavelength conversion device when the pump beam of the optical source is incident on an input facet of the wavelength conversion device; and the optical system is programmed to:

generate at least a portion of a laser image on a projection surface by operating the laser for optical emission of encoded image data, the laser image comprising a plurality of successive image frames temporally separated by an inter-frame time; and control the laser such that the pump beam switches between the at least two fundamental spectral peaks during the inter-frame time.

25. An optical system comprising a laser and a wavelength conversion device, wherein:

the laser emits a pump beam that switches between at least two fundamental spectral peaks at different wavelengths at a wavelength cycling period, the at least two fundamental spectral peaks being separated by at least 0.4 nm and having a spectral bandwidth greater than or equal to 0.2 nm; and the wavelength conversion device comprises a non-linear optical medium configured to phase match the frequency doubling of the at least two switched fundamental spectral peaks such that an output beam that switches between at least two frequency-converted spectral peaks at different converted-wavelengths with approximately equal power is emitted from an output facet of the wavelength conversion device when the pump beam of the optical source is incident on an input facet of the wavelength conversion device.

* * * * *